(12) United States Patent
McIlarky

(10) Patent No.: US 6,681,718 B1
(45) Date of Patent: Jan. 27, 2004

(54) ANIMAL FEEDING DEVICE

(76) Inventor: Scott Alan McIlarky, 37012 SE. 54th Pl., Fall City, WA (US) 98024

( * ) Notice: Subject to any disclaimer, the term of this patent is extended or adjusted under 35 U.S.C. 154(b) by 0 days.

(21) Appl. No.: 10/293,169

(22) Filed: Nov. 12, 2002

(51) Int. Cl.[7] .......................... A01K 1/10; A01K 39/00; A01K 5/00
(52) U.S. Cl. ...................... 119/53; 119/51.11
(58) Field of Search ................ 119/51.11, 53, 119/57.1, 57.5, 57.92

(56) References Cited

U.S. PATENT DOCUMENTS

| | | | |
|---|---|---|---|
| 4,020,980 A | | 5/1977 | Illes, Jr. |
| 4,030,452 A | * | 6/1977 | Keen et al. ................ 119/57.1 |
| 4,292,930 A | | 10/1981 | Olsen |
| 4,324,203 A | | 4/1982 | Chiappetti |
| 4,415,102 A | | 11/1983 | Teske |
| 4,513,688 A | | 4/1985 | Fassauer |
| 4,922,857 A | * | 5/1990 | Arentoft ................... 119/51.11 |
| 5,245,949 A | * | 9/1993 | Hively ........................ 119/53 |
| 5,622,467 A | | 4/1997 | Pethullis |
| 6,116,471 A | * | 9/2000 | Miller ......................... 119/53 |
| 6,427,628 B1 | * | 8/2002 | Reece ...................... 119/51.11 |

* cited by examiner

Primary Examiner—Charles T. Jordan
Assistant Examiner—Elizabeth Shaw

(57) ABSTRACT

An animal feeding device (25) is disclosed comprising a hopper (34) for storing a volume of flowable animal food particulate and having a discharge aperture (38). A directing structure (47) is arranged substantially inside of the hopper (34) to create a void or urging area (62) around the discharge aperture (38) into which the food particulate is inhibited from freely flowing. An urging member (63, 64, 65, 66, or 67) is adapted to movably engage and urge food adjacent the urging area (62), into the urging area (62), and into the discharge aperture (38) wherein gravity urges the food to exit the hopper (34) and travel through a conveying structure (40) to a receptacle (46) from which an animal may feed. The inventive device for, and method of, dispensing the food to an animal provides superior resistance to bridging, pinched, jammed, or crushed of the food and, therefore, provides trustworthy economical operation.

27 Claims, 16 Drawing Sheets

ANIMAL FEEDING DEVICE

FEDERALLY SPONSORED RESEARCH

Not Applicable

SEQUENCE LISTING OR PROGRAM

Not Applicable

BACKGROUND

1. Field of Invention a) This invention relates to a device for making available to animals predetermined quantities of food at predetermined times.

2. Description of Prior Art

Pet owners increasingly consider their pets to be members of the family, and as such, desire to maintain their pets at a high standard of health and happiness. Pet nutrition is recognized as a significant part of pet maintenance. The abundance of premium brand and specialized diet pet foods now available are proof of pet owners increasing desire to control the quality of their pet's nutrition. However, when confronted with controlling the quantity of food and frequency of feeding, pet owners presently have unsatisfactory choices.

The basic method for controlling a pets nutrition is for the owner or a caregiver to personally feed a pet measured quantities of food one or more times daily. This is often not practical or convenient given many pet owners busy, irregular or unpredictable schedules. Additionally, since the pet associates the owner with providing food, implementing a diet often results in ignescent begging by the pet. These disadvantages may cause the pet owner to abandon their pet's diet program and resort to free feeding. Also, if the pet owner must be away from home for several or more days, supplying nutrition to their pet involves finding trustworthy care in the form of a pet sitter or kennel. Such situations will very likely result in disruption of the diet program, stress to the pet and monetary costs; all of which are undesirable.

Thus there exists the need for a reliable device for dispensing predictable predetermined quantities of pet food at predetermined times and capable of substantially autonomous operation. There are numerous prior art disclosures of automatic animal feeders in this area of animal husbandry. However, the prior art has not offered a solution that is fundamentally:

(a) convenient and easy to use, clean and maintain (b) operationally reliable to the point that a pet owner can trust that their pet or pets are properly fed while unattended, even for extended periods of time.

The majority of previously proposed inventions commonly disclose a hopper for storing a large amount of flowable dry animal food, a mechanical means of dispensing a quantity of the animal food from the hopper and a receptacle or bowl for receiving the food where it becomes available to the animal. For the most part, it is only the means of urging or dispensing the animal food from the hopper and conveying it to the bowl that differentiates these prior art examples.

Some, as illustrated in U.S. Pat. Nos. 5,794,560 and 6,196,158 respectively, disclose means to open an orifice in the bottom of the food storage hopper and thus allow gravity to urge the food from the hopper. Other inventions utilize gravity in cooperation with a discharge assistant mechanism to dispense or convey animal food from an opening in the bottom of the hopper. Some employ a mechanically driven auger member as in U.S. Pat. Nos. 6,401,657, and 6,135,056. Others employ an agitating or rotating member as in U.S. Pat. Nos. 4,513,688 and 4,292,930.

These methods benefit from being adaptable to timer-controlled operation. They all, however, suffer from the likelihood of trapping or pinching food particles within the biasing or scissoring elements of their respective discharge or urging mechanisms. This results in crushing of the food, jamming of the mechanism or both. This likelihood of the dispensing or urging mechanisms in these prior art disclosures becoming partially or completely inoperative and unable to reliably dispense nutrition to an animal makes them untrustworthy and unacceptable to a caring pet owner. Additionally, many of these disclosures comprise areas within the unit that are difficult to access for cleaning and therefore present sanitation risks due to the inevitable buildup of fine particulate and residue within the units disclosed.

U.S. Pat. Nos. 6,227,143 and 4,722,300 disclose animal feeders that utilize a vibrating trough or chute located beneath an opening in the bottom of the hopper to urge food to a receptacle. While this solution reduces the likelihood of jamming the mechanism or crushing the food, it is nearly incapable of dispensing predictable, consistent, predetermined quantities of food.

Another common disadvantage of all the afore mentioned prior art is a propensity of the flowable animal food within the hopper to bridge above their relatively small or narrow discharge orifices. This can result in little or no food being dispensed making them an unreliable option.

Many of the prior art disclosures also suffer from a number of other disadvantages:

(a) They are prone to accidental discharge of food by the jostling or tipping over of the unit by a determined hungry animal.

(b) They do not provide for a way to feed more then one animal with a single unit.

(c) In addition to setting a timer mechanism, the operator (pet owner or caregiver) is required to make other complex manual adjustments to the device.

(d) They present numerous safety risks for both pets and people due to the accessibility of operating mechanisms.

U.S. Pat. Nos. 5,150,664 and 5,265,560 disclose animal feeders that store multiple single servings of animal food in separate compartments within the unit that are made available to the animal at predetermined intervals. These disclosures do not suffer many of the disadvantages of the prior art heretofore discussed such as propensity to jam or bridge, or from being difficult to clean. They also have the advantage of being able to provide an animal with moist or semi moist food, or liquid, in addition to dry animal food. They are, however, less convenient since they require the pet owner or caregiver to pre-measure each serving and place it in individual compartments. This, combined with the relatively small number of servings the units are capable of storing, make these prior art disclosures less desirable for continuous diet control or impracticable for longer periods of unattended feeding.

OBJECTS AND ADVANTAGES

Accordingly, several objects and advantages of the present invention are to provide an animal feeding device of superior trustworthiness and convenience for dispensing animal food that:

(a) provides superior resistance to malfunction or becoming inoperative due to food particulate becoming trapped, pinched or jammed within the feeder;

(b) is very unlikely to crush or pulverize food particles;

(c) provides superior resistance to bridging of the flowable food stored within the hopper;

(d) provides for superior sanitation through ease of cleaning and maintenance by providing convenient access to all surfaces with which the food comes in contact;

(e) consistently dispenses the correct predetermined amounts of animal food that the pet owner or caregiver desires;

(f) is capable of storing a large amount of flowable animal food;

(g) once filled with animal food and set or programmed by the pet owner with the desired food quantities and feeding intervals, is capable of trustworthy autonomous operation over an extended period of time;

(h) because the pet associates the device and not the owner with providing food, reduces ignescent begging that can result from the implementation of a diet program (i) does not require manual manipulation or adjustments of the dispensing mechanism by the owner in order to regulate the quantity of food dispensed;

(j) provides superior safety for pets and people alike;

(k) due to its highly reliable and largely autonomous operation, can provide some people who would not normally be as capable of pet ownership i.e. the elderly, disabled, or handicapped, the opportunity to maintain a pet in their home.

Other objects and advantages are to provide an animal feeding device offering superior resistance to the discharge of food if the feeder is jostled, which can optionally be removably attached to a wall or other stable surface so as to resist accidental discharge or being tipped over, which can be modified to feed more than one animal, which provides a battery back-up that allows the feeder to operate during a loss of power to the unit. All objects and advantages combine to provide a pet or animal owner with a reliable device to conveniently control the diet of their pet or animal. And in doing so, enhance their pet's health, avoid costs incurred by unhealthy overweight pets, and some or all of the costs of providing care when the pet owner is away from home for extended periods of time. Still other objects and advantages will become apparent from a consideration of the ensuing description and drawings.

SUMMARY

In accordance with the present invention a device for dispensing flowable preferably dry animal food comprising a hopper for storing a volume of the intended animal food, a discharge passage or aperture in the bottom of the hopper, a directing structure arranged within the hopper that creates a void within the stored food and around the discharge aperture and into which the stored food is inhibited from freely flowing. The device further comprises an urging member arranged to urge the food adjacent the void into the void and into the discharge aperture after which the food is directed to a receptacle or bowl where the food is then available for consumption.

DRAWINGS

Drawing Figures

Examples of the invention, and modified elements thereof will be described with reference to the accompanying drawings wherein like numerals indicate like elements. Related Figs have the same Fig number but different alphabetic suffixes.

DETAILED DESCRIPTION

All elements of the feeder are preferably constructed with, or formed of, suitably strong and rigid materials of types well known to one skilled in the art. Processes, fasteners, or elements well known to one skilled in the art can be employed to effect necessary connection, joining, attachment, or assembly of elements of the invention.

Figure 1:
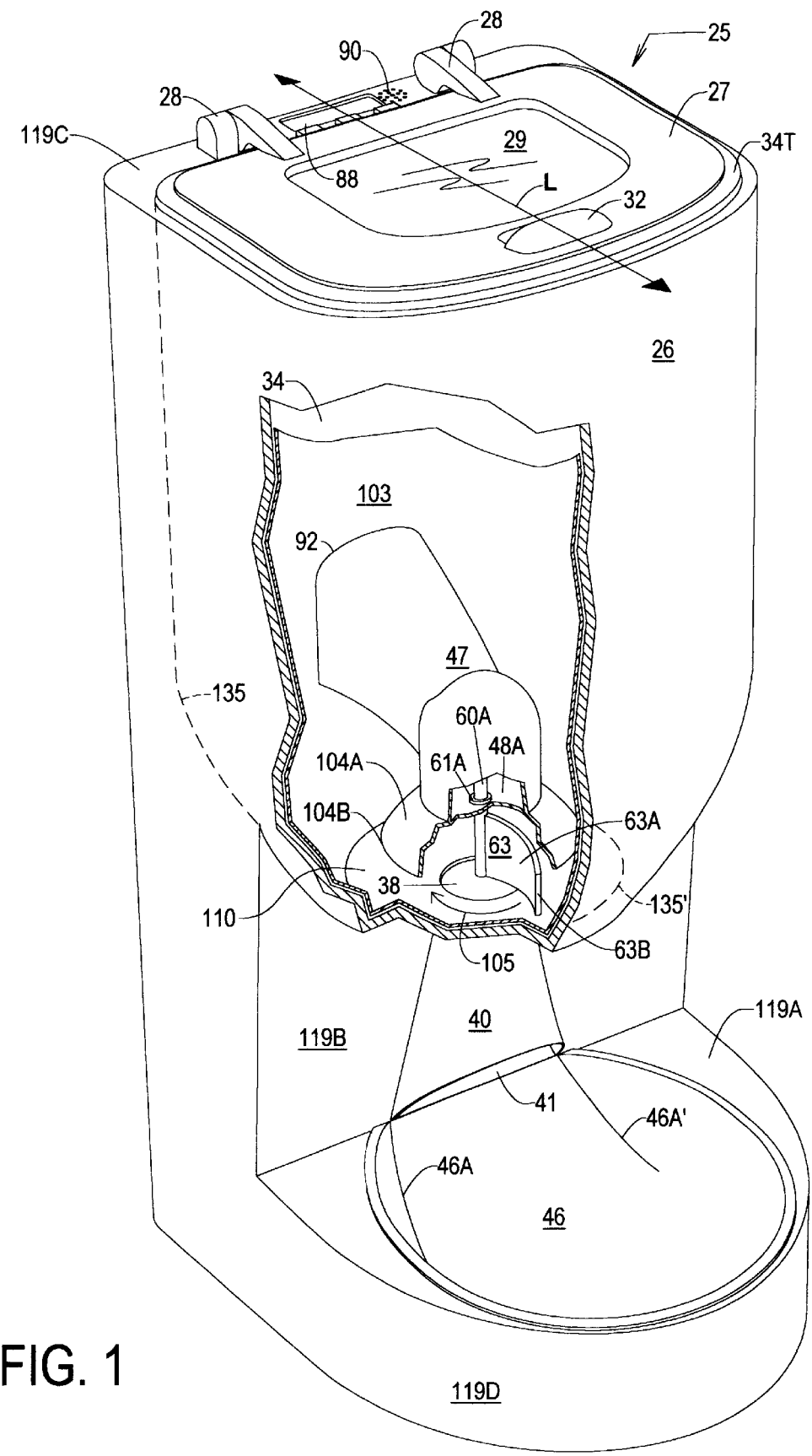
FIGS. 1 and 2 show views of a preferred embodiment of an animal feeding device in perspective (FIG. 1) and longitudinal section (FIG. 2) views.

Description—FIG. 1

A preferred embodiment of a device 25 for dispensing flowable food particulate for animals is illustrated in perspective view with sectional views of some members. The device 25 has a support structure or housing 26 with a base portion 119D suitable for supporting stable upright placement of the device 25 on a generally level floor or surface. The longitudinal direction is illustrated with an arrowed line and a reference symbol L.

A one-piece removable vessel, container, or hopper 34 is nested within and supported by a portion of the housing 26. The hopper 34 is preferably of a size and configuration to hold a volume of flowable animal food particulate sufficient to feed the intended animal for a number of days. The hopper 34 has an access opening in a top 34T of the hopper 34 that is obscured from view by a hopper lid 27. The access opening is preferably configured to be large enough to facilitate filling of the hopper with food from a large bag or other container and facilitate access the interior. The lid 27 is hingedly connected to a top surface 119C of the housing 26 by a plurality of hinges 28. Incorporated in the forward area of the lid 27 is a latch that is obscured from view by a partial latch cover 32. The latch is arranged to engage the rim of the hopper access opening and can be one of many well-known types suitable for keeping the lid 27 securely closed. The lid 27 is preferably configured to mate with and substantially seal the hopper access opening. A gasket or other resilient material (not shown) may be employed at the perimeter of mating between the lid 27 and the access opening. A portion of the housing 26 and the hopper 34 are shown in section in order to show a portion of the hopper interior. Substantially vertical interior wall or walls of the hopper 34, partially illustrated with hidden line 135, slope downwardly to a substantially circular planar floor 110, partially illustrated with hidden line 135'. A discharge passage or aperture 38 is arranged in the center of the hopper floor 110. The diameter of the discharge aperture is preferably of a sufficient size to facilitate discharge of the intended food particulate.

Disposed within the hopper interior is a directing structure 47 preferably adapted to be removably attached, mounted or coupled at a suitable location to a coupling surface (not shown) disposed in the housing 26 through a suitable coupling mechanism, examples of which are illustrated in subsequent Figs. From a point of coupling 92 on a back wall 103 of the hopper interior the directing structure 47 projects forwardly and downwardly. The illustrated cut away portion of the directing structure 47 exposes a lower interior surface 48A. This surface 48A is at an elevation above, and substantially parallel to, the hopper floor 110. It is substantially circular and coaxial with the discharge aperture 38. The directing structure 47 further comprises a directing flange 104A that projects radially outwardly and downwardly to form a lower circular edge or periphery 104B at a suitable elevation above the hopper floor 110. The flange periphery is preferably coaxial to the discharge aperture 38. The flange periphery 104B is greater in diameter than the discharge aperture 38 and preferably less in diameter than the circular floor 110. The area below the directing structure 47, above the floor 110 and substantially within the periphery 104B describe a void or an urging area which is important to the operation of the device 25 and is described in the Operation—FIGS. 1 and 2 section below.

An urging member 63 is rotatably mounted to the directing structure 47 or members enclosed therein, and comprises a vertical shaft 60A preferably disposed coaxially to the discharge aperture 38. The urging member further includes an urging element defined by a curved vane, arm, or blade 63A that is sufficiently joined to the shaft 60A so as to maintain orientation of the vane 63A. The bottom edge of the vane 63A is substantially coextensive with the bottom end of the shaft 60A, which is preferably just slightly above the elevation of the hopper floor 110. The top edge of the vane 63A at the point of joining with the shaft 60A is preferably higher in elevation than the directing flange periphery 104B and slopes downwardly as the vane 63A extends from the shaft 60A outwardly and spirally forward in the direction of discharge rotation illustrated by an arrow 105. The outer leading edge 63B is substantially horizontally coextensive with the flange periphery 104B. The elevation of the top edge of the vane 63A at the leading edge 63B is just below the periphery 104B. The top edge or surface of the vane may alternatively be arranged to conform to the frusto-conical or concave underside surfaces of the directing flange 104A and the directing structure surface 48A with a slight vertical clearance.

The urging member 63 is suspended from and below the directing structure 47 by the shaft 60A. The upper portion of the shaft passes through a support bearing 61A and into the directing structure 47 wherein the shaft 60A is suitably connected to motor drive elements (not shown) arranged to rotate the urging member around the vertical axis of the shaft 60A.

Disposed below the hopper 34 in a substantially vertical portion 119B of the housing 26 is a conveying structure, tube, or chute 40. The upper opening or inlet aperture of the conveying structure 40 is obstructed from view in FIG. 1 by the floor 110. The inlet aperture of the conveying structure is coaxially disposed immediately below the hopper discharge aperture 38. The conveying structure 40 preferably enlarges or widens as it extends downwardly towards the conveying structure outlet 41, a portion of which suitably abuts or overlaps an edge of a bowl 46 of sufficient capacity to hold at least one predetermined serving of the intended food particulate. While the bowl 46 may be integrally formed as a recess into the housing 26, it is preferable that the bowl 46 be removable from the device 25 as illustrated with the bowl 46 nested into a complementarily shaped recess or opening in a substantially horizontal surface 119A of the housing 26. A flange or lip 46B of the bowl 46 rests on the rim of the opening. The curvature of the bowl 46 is illustrated by contour lines 46A and 46A'.

A sufficiently transparent member or window 29 is set into the lid 27 and may optionally have UV filtering characteristics to better preserve the food particulate. Window elements may additionally or alternatively be disposed in an upper area of a hopper wall and/or the housing 26. A timer control interface 88 and an audio signal generating module 90 are disposed in a top surface 119C of the housing 26. A lid condition-sensing module (not shown) of a type well known is preferably cooperatively arranged with the hinge 28, or the lid latch, or a suitable portion of the lid 27 to prevent the device from operating when the lid is unlatched or opened.

Figure 2:
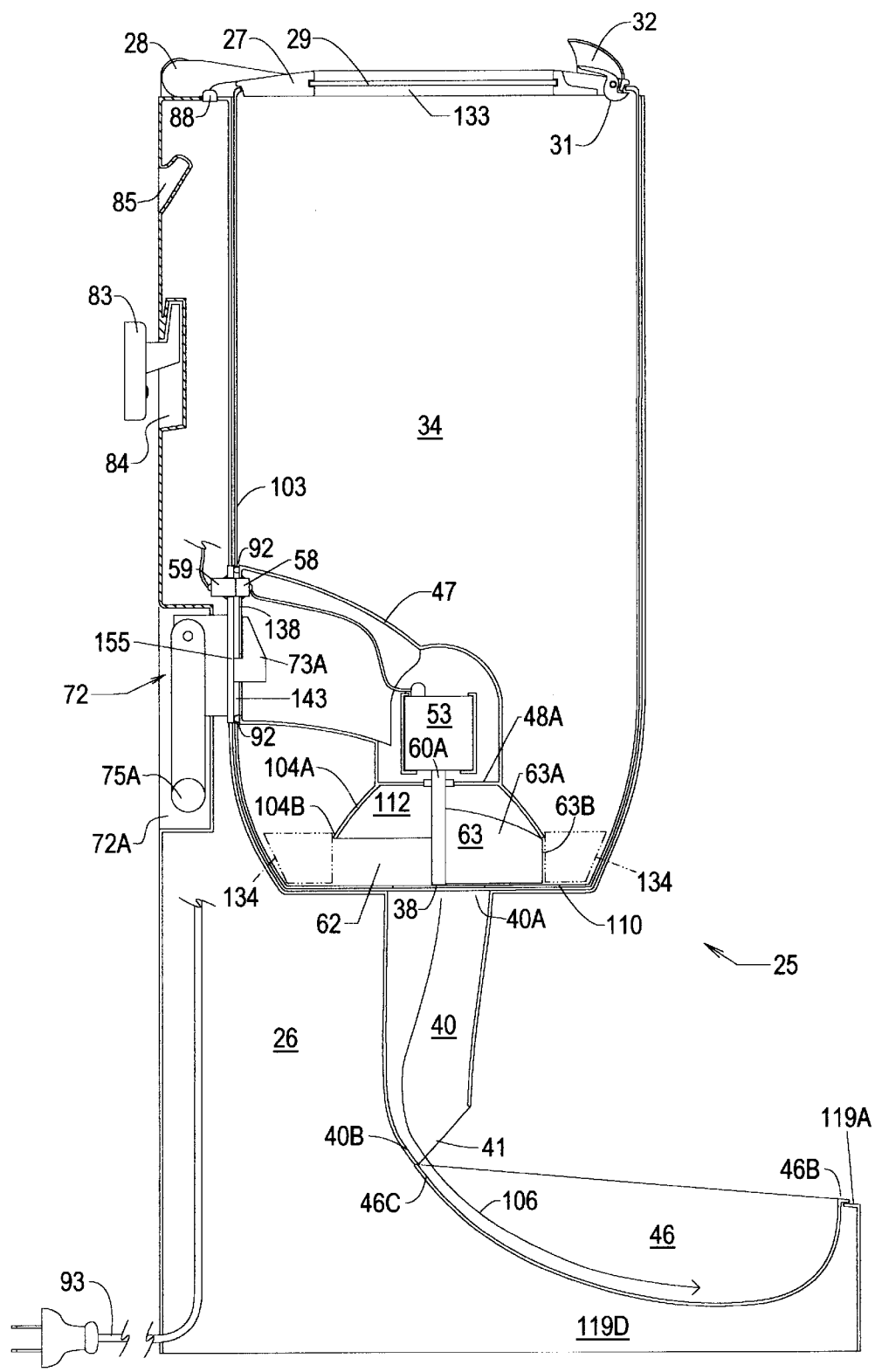

Description—FIG. 2

FIG. 2 illustrates an elevation view of the device 25 wherein some members are illustrated in longitudinal sectional view. FIG. 2 further illustrates the following members described in FIG. 1:

(a) The longitudinal sectional view of the lid 27, a latch 31, the window 29 and the latch cover 32 shows the disposition of the lid 27 and its arrangement within the hopper access opening 133.

(b) The longitudinal section view of the conveying structure 40 and the bowl 46 shows their previously described structure. A conveying structure inlet aperture 40A is preferably circular and arranged to suitably abut the underside of the hopper floor 110. The inlet 40A is preferably coaxial to, and slightly greater in diameter than the discharge aperture 38. The sectional view of the bowl 46 further illustrates the contour of the bowl 46 and how a lip 46B rests on the housing surface 119A. An arrowed line 106 represents a path of food particulate. A bowl entry slope 46C and a conveying structure exit slope 40B abut one another.

(c) The longitudinal section view of the surface 48A and the directing flange 104A provide illustration of how the undersides thereof form a substantially concave or frusto-conical surface 112.

(d) The horizontal clearance area between the directing flange periphery 104B and the surrounding hopper walls together with a perimeter portion of the hopper floor 110 combine to form an area of repose that is preferably substantially annular. Phantom lines and the number 134 serve to illustrate two cross-sections of this annular area of repose 134. The space encircled by the area of repose 134 and below the concave or frusto-conical surface 112 defines a void or urging area 62. The annular area of repose 134 is preferably arranged to inhibit the intended food particulate from flushing or freely flowing through gravity inward towards the discharge aperture.

(e) It can be further seen in FIG. 2 that the portion of the directing structure 47 that forwardly and downwardly extends from the area of attachment 92 forms a sort of strut portion that supports the rest of the directing structure 47 and urging member 63 disposed centrally above the hopper floor 110. The strut portion is preferably disposed at an elevation to allow the intended food particulate to flow around it and substantially fill the area below it and above the annular area of repose 134.

FIG. 2 further discloses a motor 53 supported within the directing structure 47 by interior structures or walls thereof. The urging member shaft 60A may be permanently, semi-permanently, or removably connected through suitable well-known disposition of elements to the motor output shaft (not illustrated). Many suitable well-known dispositions of a motor or a motor in conjunction with intermediate members, such as gear assemblies, adapted to convey operative motion from a motor to an urging member may be employed to impart a predetermined amount of torque, number of revolutions per minute, or other operative motion to the urging member 63. Any such motor and intermediate elements employed are preferably arranged within the directing structure 47 and sufficient to operate the device for thousands of cycles.

The directing structure 47 forms a substantially vertical wall or coupling surface 138 in which are arranged elements to operatively couple the directing structure 47 to mating elements arranged within a coupling surface 155 supported by the housing 26. The coupling surface 155 and the coupling elements contained thereon are arranged substantially flush or coplanar with the hopper wall 103. Coupling of the two coupling surfaces 138 and 155 preferably takes place through and within a complementarily arranged opening 143 in the back wall 103 of the hopper 34. Electrical connectors 58 and 59 disposed in the corresponding coupling surfaces are preferably arranged to suitably energize the motor 53 disposed within the directing structure 47. The electrical connecting members are also preferably adapted to passively connect and disconnect with the active mechanical coupling and uncoupling of the directing structure 47.

A handle 75A and a corresponding coupling member 73A are hingedly connected to a coupling mechanism 72 and are shown in the position of engagement or coupling with the directing structure 47. The handle and a portion of the mechanism 72 are disposed in a suitable recess 72A of the housing 26 wherein the structures contained are maintained substantially flush with the back of the device 25 and from which manual operation of the handle 75A is facilitated.

A power cord 93 is arranged to suitably energize the invention. A stability enhancing bracket 83 and a complementarily formed recess 84 in the back of the housing 26 are shown. The bracket 83 is preferably secured or attached to a substantially stable vertical wall or surface through suitable well-known elements such as screws at a position to optimally interface with the recess 84 when the base 119D is resting upright on a level surface or floor. One or more sets of brackets 83 and recesses 84 may be employed. A lifting handle recess 85 is disposed on the back of the housing 26. On those bottom surfaces, edges, or rims of the base 119D that are in contact with the floor there may be disposed any of a number of well-known anti-slip or gripping materials, such as rubber, adapted to resist slippage on the floor.

Operation—FIGS. 1 and 2

Filling the Hopper

The lid 27 is opened by manual manipulation of the lid latch 31 (FIGS. 2) to an unlatched position and rotation about the hinges 28 upwardly and rearwardly. The hopper may then be filled through its upper opening 133 (FIG. 2).

As the hopper 34 is filled, the food particulate flows over and around the directing structure 47. The directing structure 47 directs the food particulate away from the urging area 62 (FIG. 2) arranged substantially around the discharge aperture. The directing structure 47 and the interior surfaces of the hopper 34 function cooperatively to direct the food to aggregate in the area of repose 134 (FIG. 2) that is defined by the annular area between the flange periphery 104B and the surrounding interior hopper wall surfaces where the food establishes an angle of repose with the perimeter of the hopper floor 110A. Sufficient frictional resistance is created in the food particulate within and above the annular area of repose 134 (FIG. 2) to sufficiently inhibit free-flowing or flushing of the food particulate horizontally inward into the void or urging area 62 below the underside of the directing structure 47. This formation of the area of repose 134 (FIG. 2) and the urging area 62 (FIG. 2) substantially within it are an important inventive aspect of the present invention. The elements that create these two areas can certainly be of different configuration and shape than those illustrated in the drawings but are preferably sized and configured in accordance with the size, shape, and flowability of the intended animal food to be dispensed.

The portion of the directing structure 47 above the urging area is surrounded and enveloped by the flowable food particulate as filling of the hopper 34 progresses. Once suitably filled, the lid is rotated to a closed position at which point the latch 31 (FIG. 2) engages the rim of the opening 133 (FIG. 2) to maintain the lid 27 securely closed. Closing the lid preferably compresses any gasket material (not shown) disposed around the opening 133 (FIG. 2) to suitably seal it. The latch cover 32 (FIG. 2) is adapted to inhibit unlatching and opening of the lid by a determined animal. If the lid 27 is open or unlatched, suitable detection means (not illustrated) are preferably disposed to prevent the motor 53 (FIG. 2) from being energized. Thus, injury or malfunction due to accessing the hopper interior during operation may be avoided. The window 29 allows visual inspection of the level of the hopper's contents.

Dispensing of Food

At each feeding interval, the timer/control circuit in cooperation with a suitable power supply energizes the motor 53 (FIG. 2), which rotates the urging member 63 around the vertical axis of the shaft 60A with sufficient torque, and in the direction of discharge rotation 105. The shaft 60A is circumferentially supported by the support bearing 61A and is maintained coaxial to the outlet aperture 38 during operation through its mechanical connection to the directing structure 47 or elements contained therein. The structure 47 is suitably rigidly supported by its mechanical connection to the coupling surface 155, which, in turn, is suitably supported by the body or housing 26 of the device 25.

As the urging member rotates, the outer vertical edge 63B of the vane 63A rotates circumferentially beneath the flange periphery 104B and engages the food particulate disposed in the annular area of repose 134 (FIG. 2). The food is smoothly and consistently engaged, scooped, or urged horizontally inward through the urging area 62 (FIG. 2) along the concave length of the urging vane 63A to the outlet aperture 38 where gravity causes it to exit the hopper 34. The flow of food is regulated, in part, by the spatial disposition of the annular area of repose 134 (FIG. 2) and the average size and shape of the intended food particulate. The urging member rotates for a duration or number of revolutions commensurate to the desired quantity of food to be dispensed at each feeding interval.

After the discharge interval is complete, the motor 53 (FIG. 2) is preferably operable to reverse direction a minimum of one revolution. This reverse or anti-discharge rotation of the urging member 63 causes the food remaining adjacent the discharge aperture 38 and along the length of the urging vane 63A to be forced back away from the outlet aperture, radially outward along the convex length of the vane 63A and back into the annular area of repose 134 (FIG. 2). This clearing out of the urging area 62 (FIG. 2) serves to inhibit accidental discharge of food between feeding intervals by not leaving food adjacent to the outlet aperture 38 which may be discharged by jostling of the device 25.

As food is discharged from the outlet aperture 38, gravity urges the food remaining in the hopper 34 to flow downwardly to the annular area of repose 134 (FIG. 2). Bridging of the food in the hopper 34 is all but prevented due to the relatively large area of agitation and displacement of the food particulate in and above the annular area of repose 134 (FIG. 2) during discharge rotation and the subsequent reverse or anti-discharge rotation of the urging member 63. Jamming, pinching, or crushing of the food is unlikely since the urging mechanism employed does not contain any opposing or scissoring members capable of trapping and crushing pieces of food. By arranging the rotor within the directing structure 47 and above the urging member 63, the path for urging the food particulate is continuous and unobstructed. Also, the requirements for elements to convey rotation from the motor to the urging member are economically reduced. The urging member 63 (and all other urging member embodiments disclosed in subsequent Figs) is disposed substantially below and within the perimeter of the directing flange 104A. This reduces the amount of vertical forces exerted by the food particulate in the hopper 34 which must be counteracted by the force of the rotating urging member 63. As a result thereof, the horsepower and torque requirements for rotating the urging member are economically reduced.

Upon exiting the outlet aperture 38 the food immediately enters the conveying structure 40 through the upper inlet aperture 40A (FIG. 2). Gravity urges the food downward to exit the conveying structure 40 through the outlet aperture 41 and into the bowl 46 where it is then available to an animal for consumption. The conveying structure 40 preferably widens from top to bottom so as to discourage clogging, bridging or jamming of the food passing through it. The cooperative disposition of the conveying structure 40, the outlet slope 40B (FIG. 2), the bowl entry slope 46C (FIG. 2), the abutment of the bowl 46 to the conveying structure outlet slope 40B (FIG. 2), and the rest of the interior curvature of the bowl 46 combine to form a substantially smooth path 106 arranged to urge the food particulate to substantially slide out of the conveying structure 40 and into the bowl 46 rather then dropping into the bowl 46 resulting in excessive noise and the expulsion of food from the bowl 46 that may deter a animal from feeding. The bowl 46 is also of a shape to urge the food to come to rest at its center where it is more accessible to the animal.

The Interface

Figure 10:
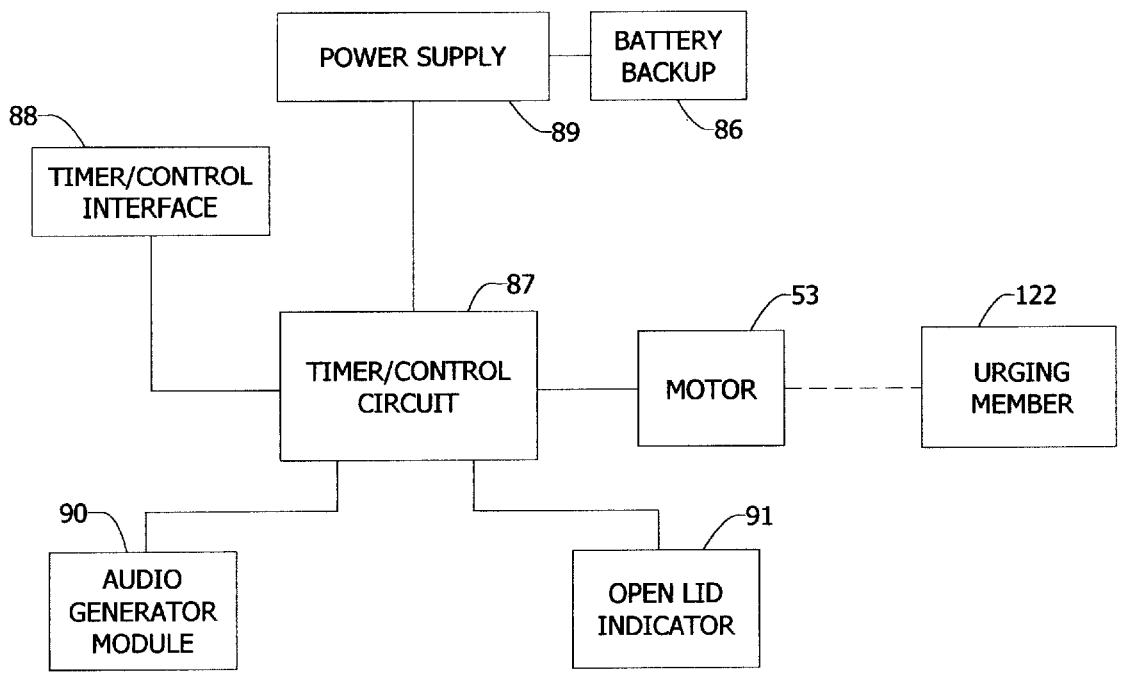
FIG. 10 shows a modular electrical layout for the animal feeding device.

The following operational description of the interface 88 includes elements that are operated from the interface and are not illustrated in FIGS. 1 and 2 but are shown in a modular schematic (FIG. 10).

The operator can access the timer/control functions through the interface 88, which comprises a plurality of buttons and a liquid crystal display (LCD). Through manipulation of the buttons in conjunction with information displayed on the LCD the operator may program the time of day, times of feedings, and quantity of each feeding. The timer/control circuit preferably allows a plurality of feedings each day and different quantities of food at each feeding interval so as to provide the animal owner with the ability to optimally regulate their pet's nutrition. The interface also preferably incorporates a suitable lockout (not shown) feature in order to prevent inadvertent input to the interface such as by an animal or child. Other additional interface functions (not shown) may optionally include:

(a) power on and off so as to be able to turn the unit off without unplugging it;

(b) LCD notification of conditions such as lid open or unlatched, low battery power, loss of household power and control of audible alert signals;

(c) the option to dispense food at non-scheduled times so as to provide a animal with an unscheduled feeding or to empty the hopper for cleaning.

Cleaning and Maintenance

A primary objective of the present invention is to provide a device that facilitates easy, convenient, thorough cleaning and maintenance. To that end, all elements with which the animal food comes in contact are preferably adapted to be removable, entirely or in part, so as to allow cleaning and maintenance of those elements elsewhere, such as at a sink, without necessitating the movement of the entire device 25

The directing structure 47 is preferably removably attached to the device. FIG. 2 illustrates a coupling mechanism 72 which is operatively described in FIGS. 4A and 4B. With the lid 27 in an open position, the directing structure 47 can be manually uncoupled and removed from the hopper interior through the access opening 133 (FIG. 2). This allows convenient manipulation of the directing structure and access to the entire interior of the hopper 34 for cleaning. The hopper 34 may be wiped out or be removed by lifting it straight up and out of the housing 26 to be cleaned elsewhere. The conveying structure 40 in FIGS. 1 and 2 is illustrated as fixed and can be sufficiently cleaned as such.

The bowl 46 is removable by first lifting up the front of the bowl then lifting forwardly upward. Removal of the bowl 46 facilitates proper cleaning with soap and water. All other accessible surfaces are preferably arranged to be easily cleaned.

Wall Brackets

Wall bracket means are preferably adapted to provide stability and inhibit jostling or tipping over of the device 25 by accidental bumping or by a determined hungry animal attempting to gain access to the food stored within the hopper 34. The invention depends on gravity to aid in its operation therefore tipping over of the invention may render it inoperable.

The bracket or plurality of brackets 83 (FIG. 2) are attached to a wall or suitably secure vertical surface at points to optimally engage complementarily shaped receiving recesses 84 (FIG. 2) disposed on the back of the housing 26. The handle recess 85 (FIG. 2) disposed on the back of the housing allows the device 25 to be manually lifted forwardly up and off of the wall brackets. The device is subsequently replaced by manually aligning the recesses 84 (FIG. 2) with the brackets 83 (FIG. 2) and moving the device 27 back and down.

Figure 3A:
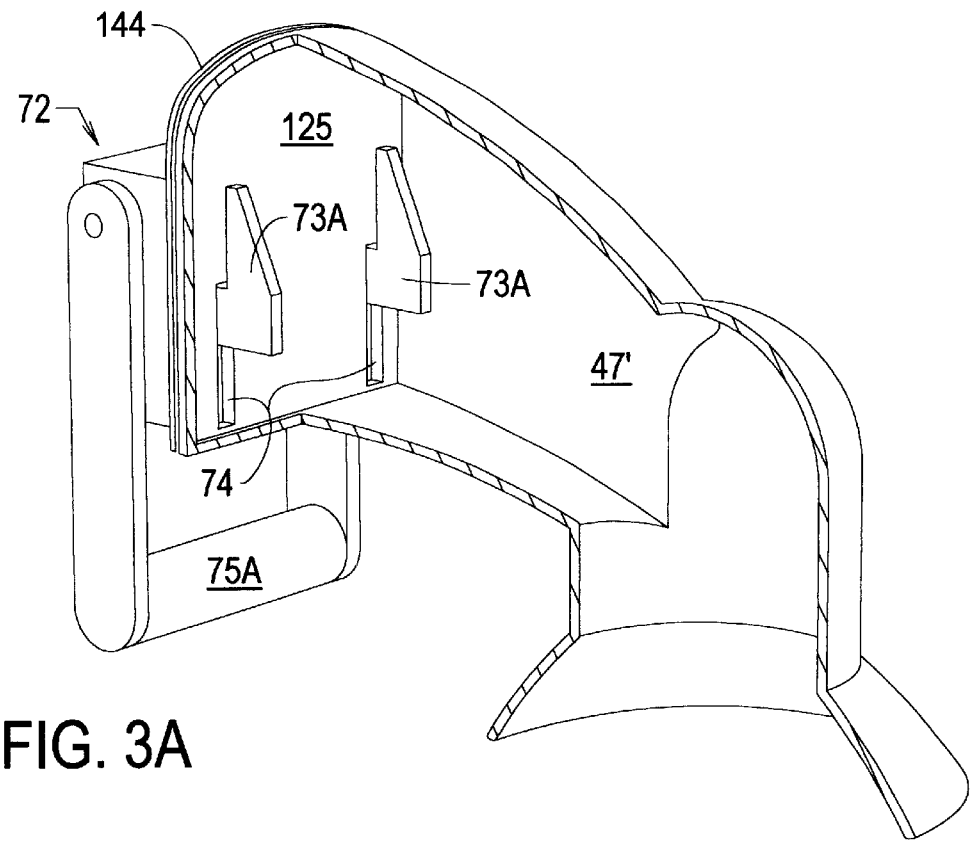
FIGS. 3A and 3B show a coupling mechanism as engaged and unengaged.
Figure 3B:
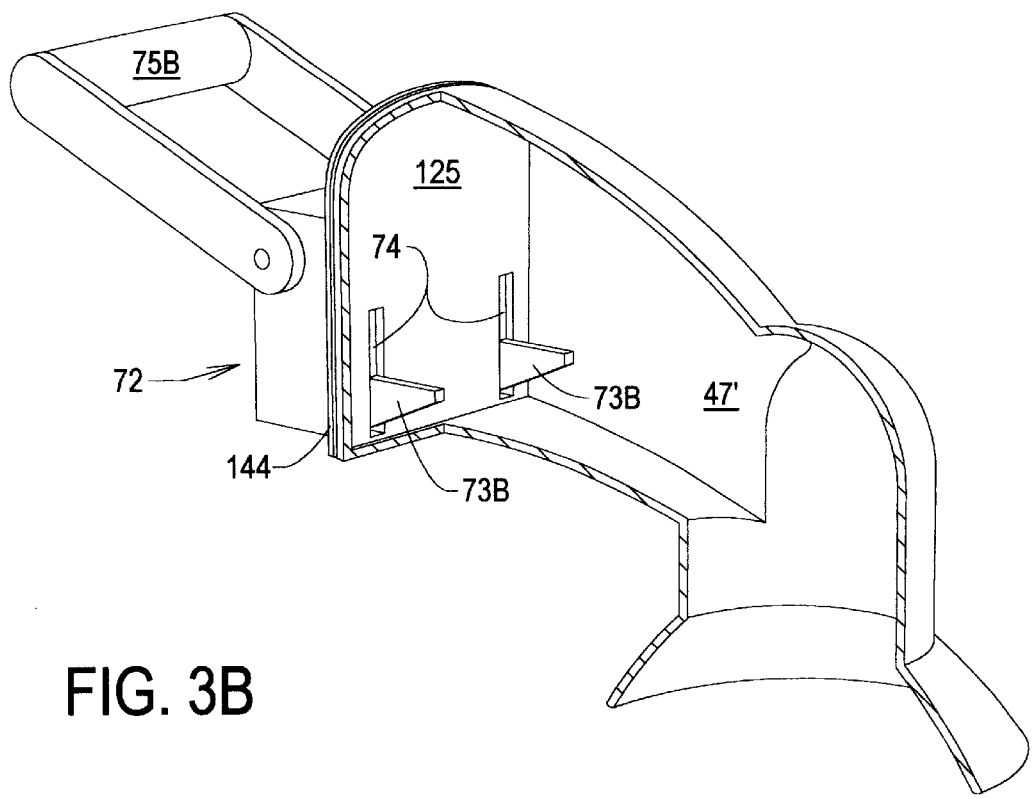

Description—FIGS. 3A and 3B

FIGS. 3A and 3B detail the coupling mechanism 72 partially illustrated in FIG. 2. Where like elements are shown in both FIGS. 3A and 3B disposed at different positions, like numbers with different letter suffixes A and B are used. Members not related to the coupling mechanism 72 have been omitted for clarity.

FIG. 3A illustrates members at rest. A directing structure 47' is shown in section and is removably attached or coupled to a corresponding coupling surface 144. The coupling mechanism handle 75A is in the downward engaged position. Each of the coupling members 73A is hingedly connected to a common horizontal axis that runs perpendicularly between them and is disposed within the coupling mechanism 72. The coupling members 73A project from the interior of the coupling mechanism 72 and through the coupling surface 144 through openings or slots, obscured from view. The coupling members enter the interior of the directing structure 47' through receiving slots 74 at which point the coupling members 73A angle vertically upward. Within the directing structure 47' the coupling members 73A frictionally engage an interior wall 125.

FIG. 3B shows the directing structure 47' as uncoupled. The coupling members 73B have been rotated downward and are disposed partially within the latching mechanism 72 and the handle 75B is in the uncoupled upward position. Mechanisms suitable for rotating engaging members in cooperation with a handle are well known and therefore not detailed.

Operation—FIGS. 3A and 3B

The coupling mechanism 72 serves to operationally couple and uncouple the directing structure 47' to the body or housing of the device. In FIG. 3A the directing structure 47' is securely coupled to the coupling surface 144. The coupling members 73A preferably pull or exert sufficient horizontal frictional pressure on the interior wall 125 rearward toward the coupling surface 144 so as to provide suitably rigid operative support of the directing structure 47'.

This frictional pressure is mechanically released when the handle 75A (FIG. 3A) is manually rotated upwards to the position of 75B (FIG. 3B). With the rotation of the handle the coupling mechanism rotates the coupling members 73A (FIG. 3A) down and back on their common horizontal axis through receiving slots 74 to the uncoupled position 73B (FIG. 3B). When uncoupled the directing structure 47' may be manually removed as described in the Operation of FIGS. 1 and 2.

To re-couple the directing structure 47', the receiving slots 74 are manually aligned with the coupling members 73B (FIG. 3B) and the handle is manually rotated from the uncoupled position 75B (FIG. 3B) downward to the coupled position 75A (FIG. 3A). Movement of the handle rotates coupling members 73B (FIG. 3B) upwardly and forwardly into the interior of the housing to the position of engagement 73A (FIG. 3A) with the interior wall 125.

Figure 4A:
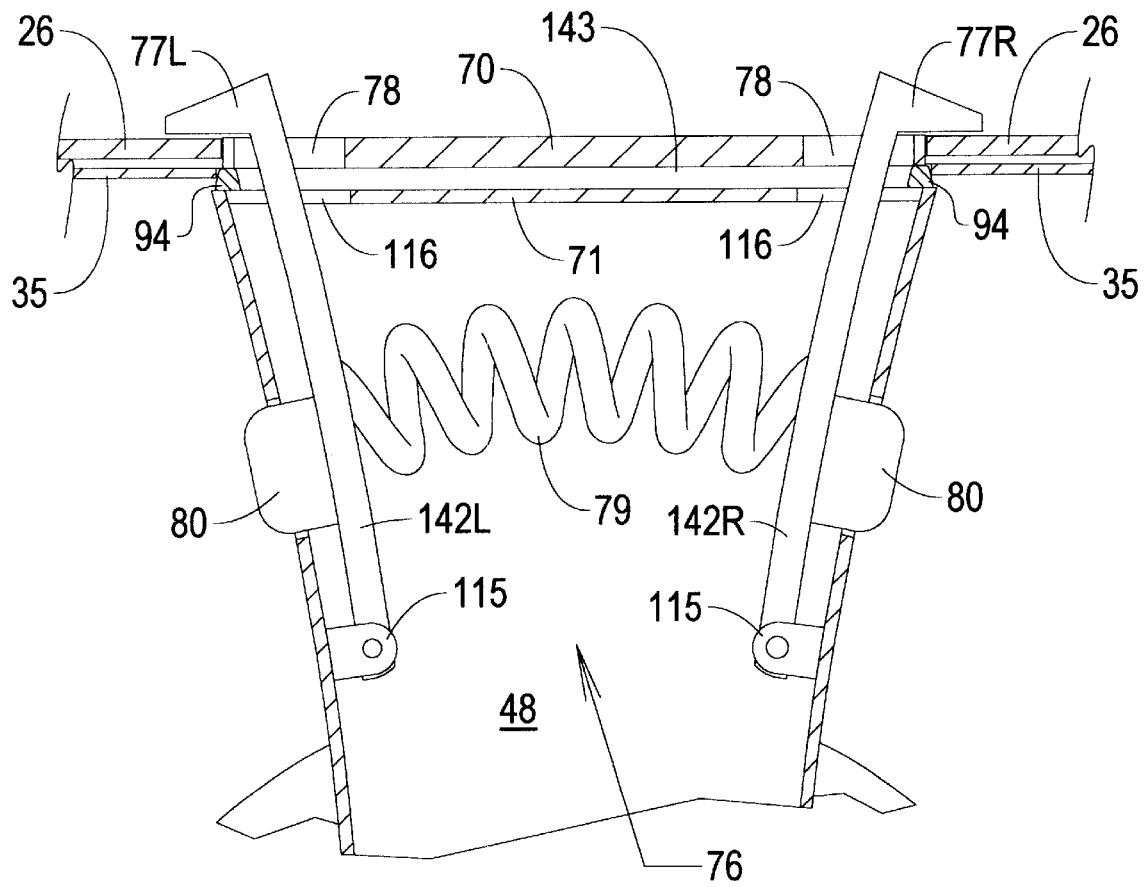
FIGS. 4A and 4B show an alternative coupling mechanism as engaged and unengaged.
Figure 4B:
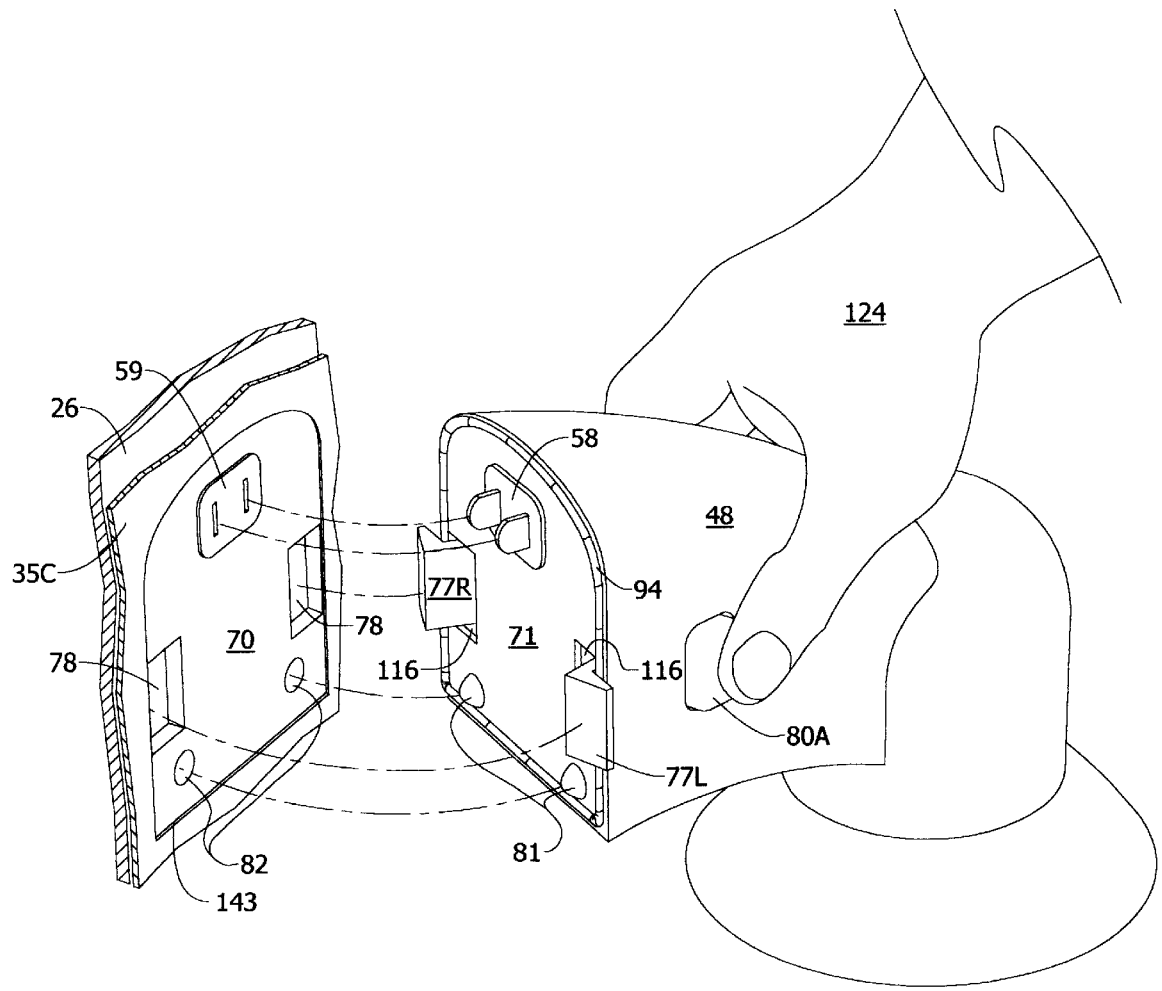

Description—FIGS. 4A and 4B

FIGS. 4A and 4B primarily illustrate an alternative mechanism 76 (FIG. 4A) to operatively couple a directing structure 48 to a coupling surface 70. FIG. 4B shows the directing structure 48 uncoupled and turned at approximately 30 degrees to the right from a coupling surface 70. A section of wall of the hopper 34 is shown with an opening 143 through which coupling takes place. The coupling mechanism illustrated in FIGS. 4A and 4B is mechanically the reverse of the mechanism 72 (FIG. 3A and 3B) insofar as the active manually manipulated members of the mechanism are disposed as elements of the directing structure 48.

FIG. 4A is a top sectional view illustrating the directing structure 48 coupled to the coupling surface 70. The mechanism 76 (FIG. 4A) comprises a plurality of arm members 142L and 142R, each of which are secured within the interior of the directing structure 48 by a hinge 115, and on which is vertically disposed a laterally outward facing button 80 that protrudes from the interior of the directing structure 48 through a complementarily arranged opening. Each arm, 142L and 142R respectively, extends rearwardly from its hinge 115 exiting the directing structure 48 through an aperture 116 of a coupling surface 71. Each arm continues rearward thorough a receiving aperture 78 in coupling surface 70 after which it immediately forms a catch or hook 77L and 77R. The catches 77L and 77R are horizontally opposite each other and are preferably arranged to optimally engage an area on the backside of the coupling surface 70 outwardly adjacent the receiving apertures 78 as illustrated. The arms 142L and 142R are pretensioned laterally and horizontally opposite each other by a compression coil spring 79 disposed horizontally between them. Other members optionally present in the coupling surfaces 70A and 70B are omitted in FIG. 4A for clarity but are illustrated in FIG. 4B.

FIG. 4B affords a better spatial understanding of the coupling mechanism 76 and the corresponding receiving apertures 78 illustrated in FIG. 4A. A hand 124 illustrates manual manipulation of the buttons 80 and removal of the directing structure 48 from the coupling surface 70. A gasket 94 is disposed near the periphery of the coupling surface 71. Suitable gasket material may alternatively or additionally be disposed on the coupling surface 70 or on the rim of the hopper wall opening 143.

Also disposed in the coupling surfaces 70 and 71 and connected by projection lines are mating electric connectors 58 and 59 and suitable alignment assistants 81 and 82 comprising male projections and corresponding female recesses.

Operation—FIGS. 4A and 4B

FIG. 4A illustrates the mechanism 76 operationally coupling the directing structure 48 to the coupling surface 70. To effect uncoupling the buttons 80 are manually pressed laterally inwardly by the fingertips while manually grasping the directing structure 48 from above as illustrated by the hand 124 (FIG. 4B). Inward movement of the buttons results in like movement of the arm members 142L and 142R (FIG. 4A) on their hinges 115 (FIG. 4A) against the lateral outward tension of the spring 79 (FIG. 4A). The catch portions 77L and 77R are, therefore, similarly moved within the apertures 116 and 78 from a position of frictional engagement with the housing 26 to a point at which the directing structure 48 may be moved forward and away from the coupling surface 70.

Coupling the directing structure 48 to the coupling surface is effected by depressing of the buttons 80, aligning and inserting the catches 77L and 77R into the receiving apertures 78, and releasing the buttons so as to allow the spring 79 (FIG. 4A) to push the catches 77L and 77R horizontally outward to a point of frictional engagement or coupling with the backside of the surface 70 and housing 26.

FIG. 4B illustrates additional elements disposed in the coupling surfaces 70 and 71 that passively couple and uncouple when the coupling mechanism 76 actively couples and uncouples the directing structure 48 to the coupling surface 70. Connectors 58 and 59 electrically connect motor means (not shown) arranged within the directing structure 48 to energizing components within the device housing. Alignment assistant means 81 and 82 facilitate proper alignment during coupling.

Many well-known combinations of mechanisms and elements, which are suitable to accomplish the preferred coupling, may be employed in the device. The frictional coupling pressure of the mechanism employed is preferably:

(a) sufficient to adequately compress any gasket member disposed between coupling surfaces so as to sufficiently seal the coupling surfaces from infiltration of fine particulate;

(b) sufficient to couple any other passive or semi-passive connecting members arranged to connect with the mating of the coupling surfaces;

(c) sufficient to provide effective vertical and horizontal support and stability to maintain the coaxial disposition of the urging member with the outlet aperture while at rest and during operation;

(d) sufficient to prevent accidental uncoupling and to maintain the mechanical coupling even if the device is jostled, moved, or otherwise roughly handled.

Figure 5:
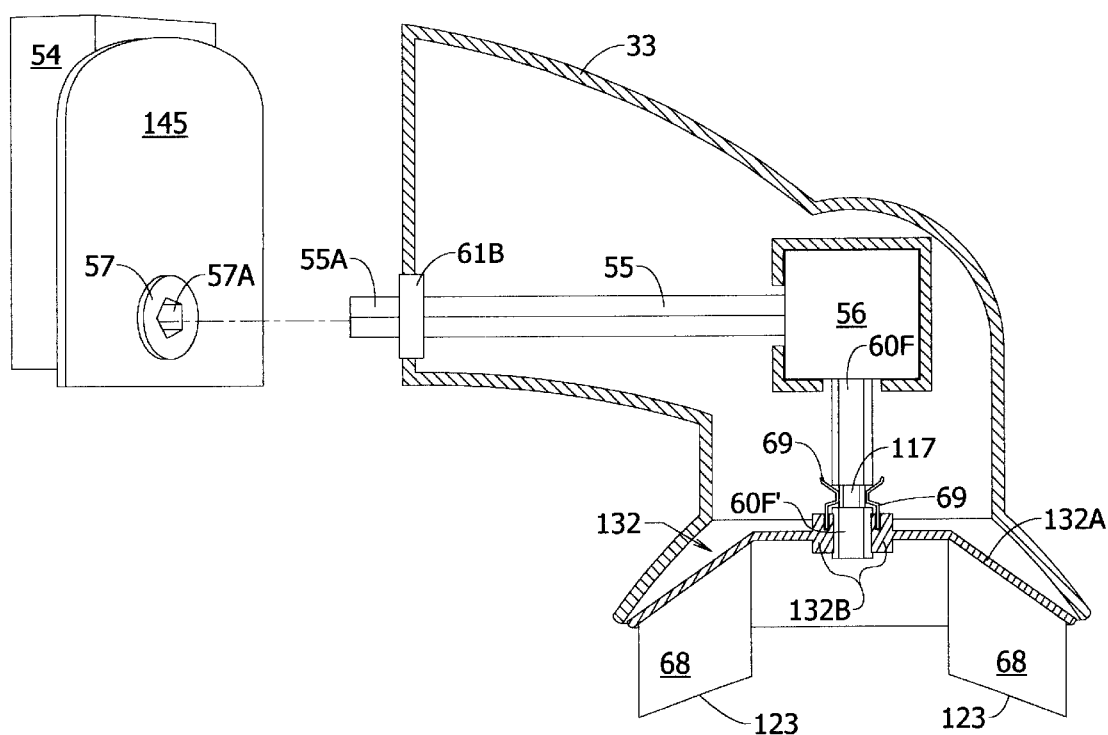
FIG. 5 shows a removable urging member and alternative placement of a motor outside of a directing structure.

Description—FIG. 5

FIG. 5 illustrates an alternative disposition of a gear motor module 54 outside of a directing structure 33 and a modified detachable urging member 132. The directing structure 33 and the urging member 132 are shown in longitudinal cross-section. A coupling surface 145 and a motor 54 are turned slightly so as to clearly illustrate those members. Other coupling members are omitted from FIG. 5.

The urging member 132 comprises urging elements defined by two separate vertically spirally arranged vanes 68, the top edges of which, are joined to and supported by a circular frusto-conically shaped portion 132A. The vanes 68 project downwardly from the underside of the conical slope of the frusto-conical top 132A. The bottom edges 123 are shaped to conform to the floor of an alternative embodiment of a hopper illustrated in FIG. 6. A socket 132B with a hexagonally shaped opening is disposed in the center of the frusto-conical top 132A. A plurality of retaining clips 69 project upwardly from the socket 132B and are pretensioned centrally A rotatable socket 57 with a hexagonal socket opening 57A is part of the gear motor module and is arranged in the coupling surface 145. A hexagonal drive shaft 55 is horizontally disposed within the directing structure 33. An end 55A of shaft 55 projects from the interior of the structure 33 through a suitable support bearing 61B. The projection line illustrates the path of interface between the shaft end 55A and the socket opening 57A. A right angle gear box 56 is arranged within the directing structure 33 and suitably links shaft 55 to a vertically disposed hexagonal shaft 60F. Shaft 60F is preferably circumferentially and rotationally supported at a suitable elevation by a bearing member (not shown), and comprises an end 60F' and a circumferentially arranged notch 117.

Operation—FIG. 5

The directing structure 33 is coupled to the coupling surface 145 in a manner previously disclosed and during which, the drive shaft projection 55A is aligned and inserted into the complementarily shaped socket opening 57A. At a feeding interval, the gear motor 54 is energized and imparts rotation of sufficient torque, correct direction, and predetermined number of revolutions per minute to the drive socket 57. The rotation of the drive socket 57 conveys rotation to the projection 55A nested within. The drive shaft 55 is thusly rotated within the support bearing 61B and imparts rotation to the vertically disposed drive shaft 60F through the right angle gear 56. The mechanical connection between the urging member 132 and the shaft 60F and the circumferential shaft support (not shown), results in stable rotation of the urging member 132.

With the directing structure 33 uncoupled from the coupling surface 145 and preferably removed from the hopper interior, the urging member 132 may be removed from the drive shaft 60F. The urging member 132 is removed by grasping the directing structure 33 with one hand, the urging member 132 with the other and applying a pulling force sufficient to retract the retaining clips 69 from the shaft notch 117. Removal of the urging member 132 facilitates maintenance and cleaning. The urging member 132 is reattached by aligning the socket 132B with the shaft end 60F' and applying the reverse linear pushing force sufficient to spread the retaining clips outward and thus allow passage and reengagement of the shaft end 60F' into the socket 132B.

Figure 6:
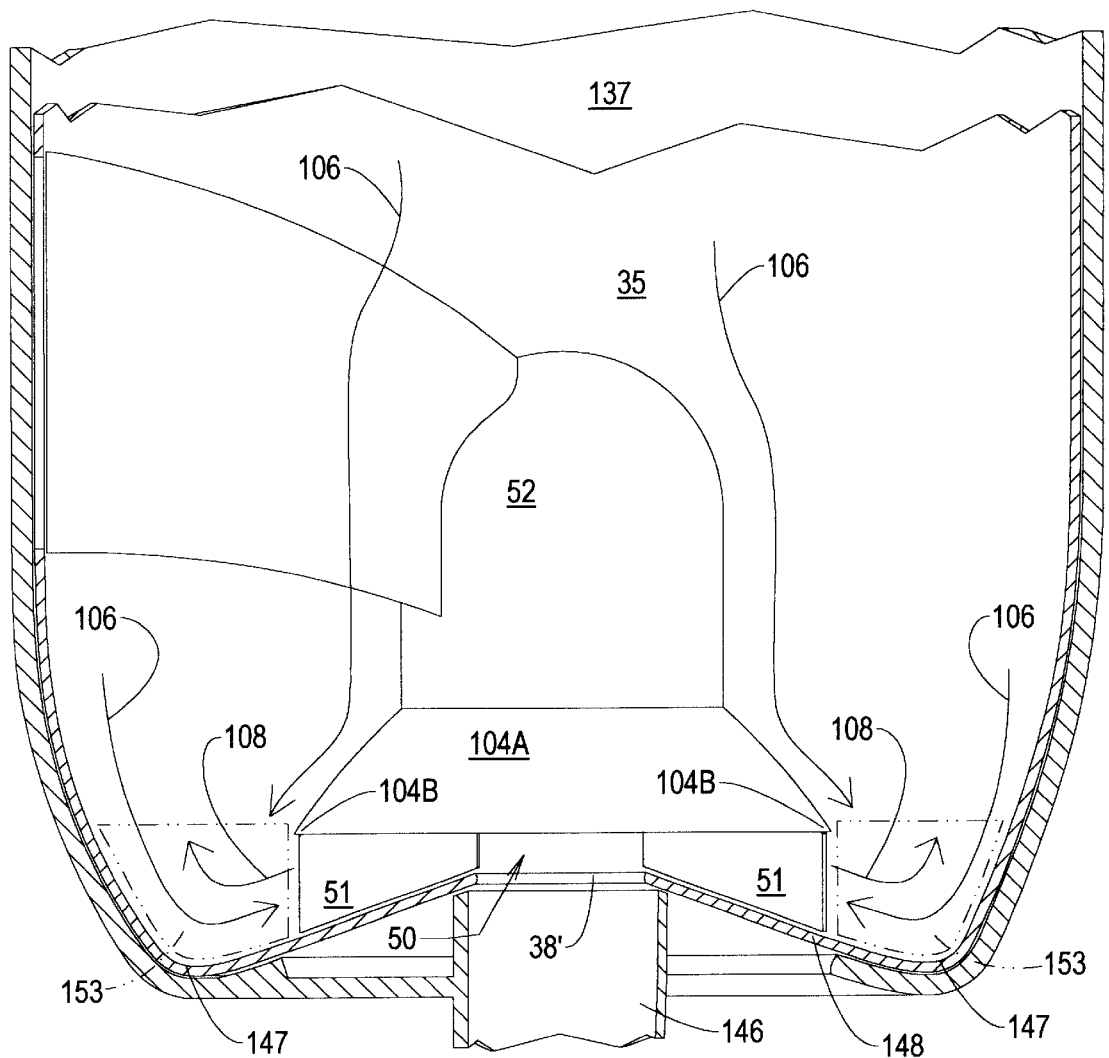
FIG. 6 shows a modified hopper with a non-planar floor and an urging member adapted thereto.

Description—FIG. 6

FIG. 6 shows a left elevation view of a directing structure 52 and longitudinal section views of portions of a removable hopper 35, a housing 137, and a conveying structure 146. The directing structure 52 is removably coupled to the device as previously described, however, coupling elements are omitted. An urging member 50 includes urging elements defined by a plurality of vanes 51, the bottom edges of which preferably conform to and have a slight clearance above a floor 148. The vanes 51 are substantially diametrically arranged around, and do not transverse, the discharge aperture 38'.

The device housing 137 is arranged to support the hopper 35, which differs from the hopper 34 (FIGS. 1 and 2) in that the hopper floor 148 is not planar. The substantially vertical wall or walls of the hopper 35 slope downwardly and inwardly to a lowest elevation or floor perimeter 147. The floor 148 comprises the surface of the hopper 35 inward of the lowest elevation or perimeter 147. The floor is preferably circular and coaxial with the discharge aperture 38'. From the floor perimeter 147, the floor 148 preferably curves or slopes inwardly and upwardly to the discharge aperture 38'. Thus the floor 148 is substantially frusto-conical as illustrated or can alternatively be substantially convex, and of a predetermined degree of upward slope or curvature. An urging area is not numbered but is defined as the substantially circular space vertically between the floor 148 and the underside of the directing structure 52 and encircled by an annular area of repose 153 shown in section view with phantom lines. The conveying structure 146 upper opening or inlet, is arranged to abut the underside of the discharge aperture 38' as previously described. A plurality of arrowed lines 106 and 108 illustrate flow paths of food particulate within the hopper 35.

Operation—FIG. 6

The upward slope of the frusto-conical floor 148 provides superior resistance, relative to the planar floor 110 (FIGS. 1 and 2), to the flushing or free-flowing of food particulate to the outlet aperture 38'. At an interval of operation motor means (not shown) impart rotation to the urging member 132. Food particulate stored within the hopper is urged downward through gravity, represented by arrowed lines 106, towards the annular area of repose 153, from there the urging member urges the food inwardly up the sloped floor 148, into the urging area, and to the outlet aperture 38'. The upward inward incline of the floor inhibits the tendency of the food to gain momentum as it is urged. This resistance to gravitational acceleration enhances the ability of the present invention to dispense consistent quantities of food particulate and also provides increased resistance to accidental discharge of food particulate when the device is bumped or jostled.

At the end of the feeding interval, the urging member 132 is preferably rotated in the opposite or anti-discharge direction approximately one or more revolutions as previously disclosed. The curved non-angular transition of the lower hopper walls into the floor 148 enhances the anti-bridging qualities of the present invention by providing the food particulate a substantially smooth path 106 through the annular area of repose 153 during discharge and a smooth displacement path 108 during the subsequent reverse rotation of the urging member.

FIGS. 7A–7E

FIGS. 7A–7E illustrate five embodiments of urging members. Each embodiment comprises a vertically disposed shaft portion, the vertical axis of which is the axis of rotation of the urging member. Each Fig shows the shaft in section for clarity. Each embodiment may alternatively be configured similarly to urging member 132 (FIG. 5) wherein the urging member shaft is omitted. Each embodiment comprises at least one urging element adapted to engage and urge food particulate, and that is joined to the urging member so as to provide sufficient support and maintain the orientation of the urging element. Each is disposed as part of a directing structure, as disclosed above, and is sized accordingly. Each is permanently or removably attached to motor drive elements. And all are adapted to reverse rotation after a discharge interval as previously disclosed.

Figure 7A:
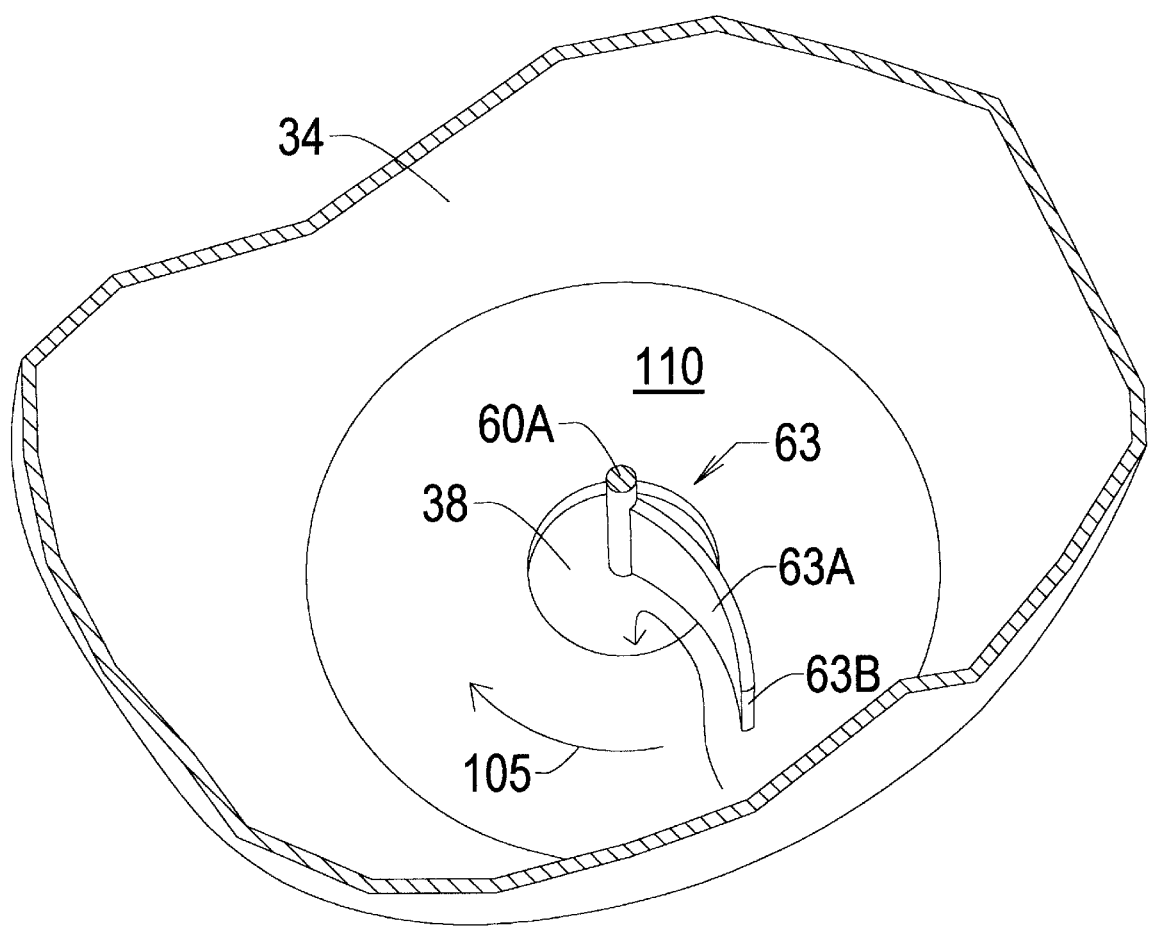
FIGS. 7A–7E show modified urging members.

FIG. 7A illustrates a lower portion of the hopper 34 (FIGS. 1 and 2) for reference. The floor 110 is planar but may also be non-planar. In any case, the lower or bottom surfaces or edges of the urging elements of the urging members shown in FIGS. 7A–7E are preferably arranged to conform to the hopper floor so as to sweep just above the floor during rotation. FIGS. 7A–7E each show the arrowed line or lines 106 illustrating the path of food particulate as it is urged from an area' of repose to the discharge aperture 38. FIGS. 7A–7E each show the arrowed line or lines 105 illustrating the direction of discharge rotation which is dictated by the spiral forward direction of the urging elements and their leading edges, which may be alternatively configured so as to discharge opposite the direction shown in each Fig. The degree of forward spiral inclination and curvature of the urging elements may vary depending on the number of such elements, the size of related elements, the size of the intended food particulate, and economy of production. The urging members shown in FIGS. 7C–7E employ a frusto-conical portion that alternatively may be upwardly convex (upper side).

Description—FIG. 7A

FIG. 7A illustrates urging member 63 disclosed in FIG. 1 and 2. Operation of urging member 63 is disclosed above in Operation—FIGS. 1 and 2.

Description—7B

Figure 7B:
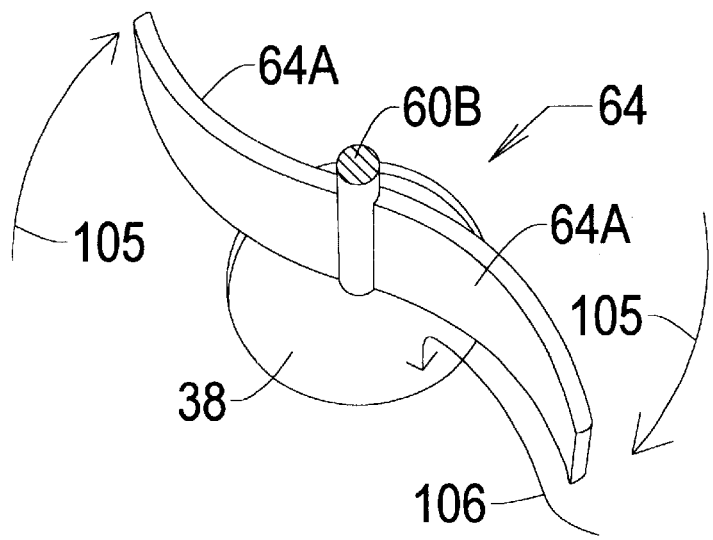

FIG. 7B discloses an urging member 64 comprising a shaft portion 60B and a plurality of urging vanes 64A, each substantially identical to the single urging vane 63A (FIG. 7A) of urging member 63 (FIG. 7A). The two vanes are joined diametrically to the shaft portion 60B.

Operation—FIG. 7B

Operation of urging member 64 is substantially identical to member 63 (FIGS. 1, 2, and 7A). The plurality of urging vanes 64A approximately doubles the volume of food particulate urged and dispensed with each rotation relative to member 63 (FIGS. 1, 2, and 7A). The plurality of vanes also serves to maintain vertical coaxial disposition of the shaft portion 60B with the discharge aperture 38 due to the torque load being exerted from opposite sides of the shaft.

Figure 7C:
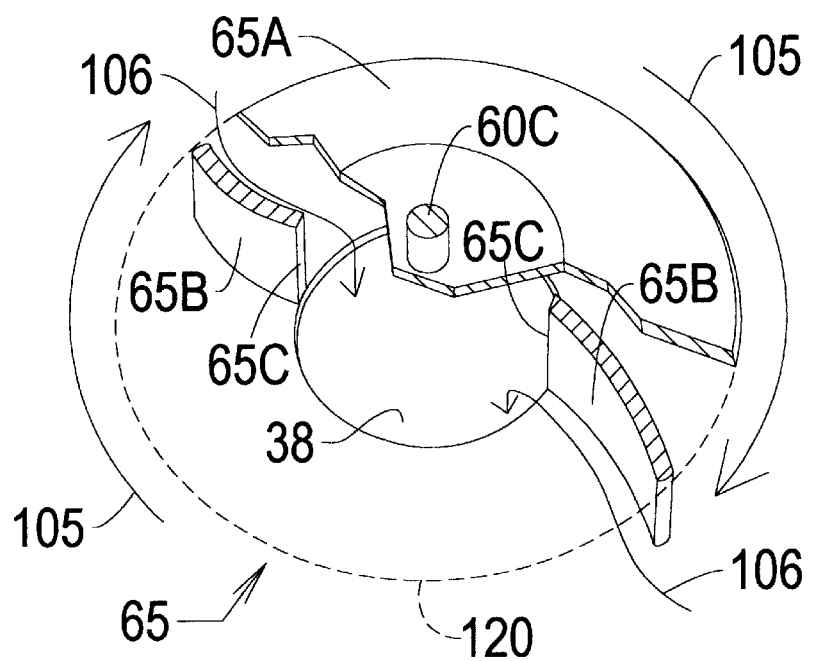

Description—FIG. 7C

FIG. 7C illustrates an urging member 65 comprising a circular upwardly inclined frusto-conical top portion 65A that is similar to the urging member 132 (FIG. 5). The frusto-conical top 65A is drawn in section and a shaft portion 60C projects upwardly from the center A dashed line 120 illustrates the periphery of the frusto-conical top 65A. The diameter and disposition of the periphery 120 relative to the directing flange periphery 104B (FIGS. 1, 2, and 6) are preferably arranged to effectively inhibit fine food particulate and residue from entering the area above the frusto-conical top 65A and the underside of the directing flange 104A (FIGS. 1, 2, and 6). A plurality of urging elements defined by two vertically diametrically disposed vanes 65B are suitably joined to, or integrally formed with, the underside of the top 65A at their upper edges or surfaces, which are, therefore, illustrated with hatching. This method of illustrating a frusto-conical top and urging elements disposed beneath it will also be utilized in subsequent FIGS. 7D and 7E.

Each of the vanes 65B comprises an inward vertical edge 65C that is coextensive with the circumference of the discharge aperture 38 and from which point the vanes extend outwardly and spirally forward in the direction of discharge rotation 105 to approximately the outer periphery 120 of the frusto-conical top 65A. In the event a hopper with a non-planar floor similar to hopper 35 (FIG. 6) is employed in the device, the slope of the frusto-conical top 65A is preferably greater than the slope of the floor so that the inner edges 65C of the vanes 65B are taller than the outer edges of the vanes.

Operation—FIG. 7C

The urging vanes 65B urge food from the annular area of repose (FIGS. 2 and 6) operatively similarly to the previously disclosed urging members. The food particulate is urged along the concave length of the vanes 65B to the discharge aperture 38. Since the vanes do not transverse the discharge aperture, dispersion and flow of the food particulate as it falls into the discharge aperture is enhanced and therefore is less likely to clump as it travels through the discharge tube 40 (FIGS. 1, 2, and 6).

The frusto-conical top 65A structurally facilitates the disposition of urging vanes that rotate diametrically around the discharge aperture without transversing it. The frusto-conical top 65A also prevents food particulate from jumping over the top surfaces of the vanes, which could result in jamming or crushing of the food. The degree of upward slope of the conical portion of the frusto-conical top 65A creates a vertical widening of the urging area between the underside of the frusto-conical top 65A and the floor 110 from the periphery 120 inward that inhibits clumping and jamming of the food as it is urged beneath the frusto-conical top 65A. Frusto-conical top portions of urging members illustrated in the following FIGS. 8D and 8E are identical to the frusto-conical top 66A, and are like in operation and operational advantages.

Figure 7D:
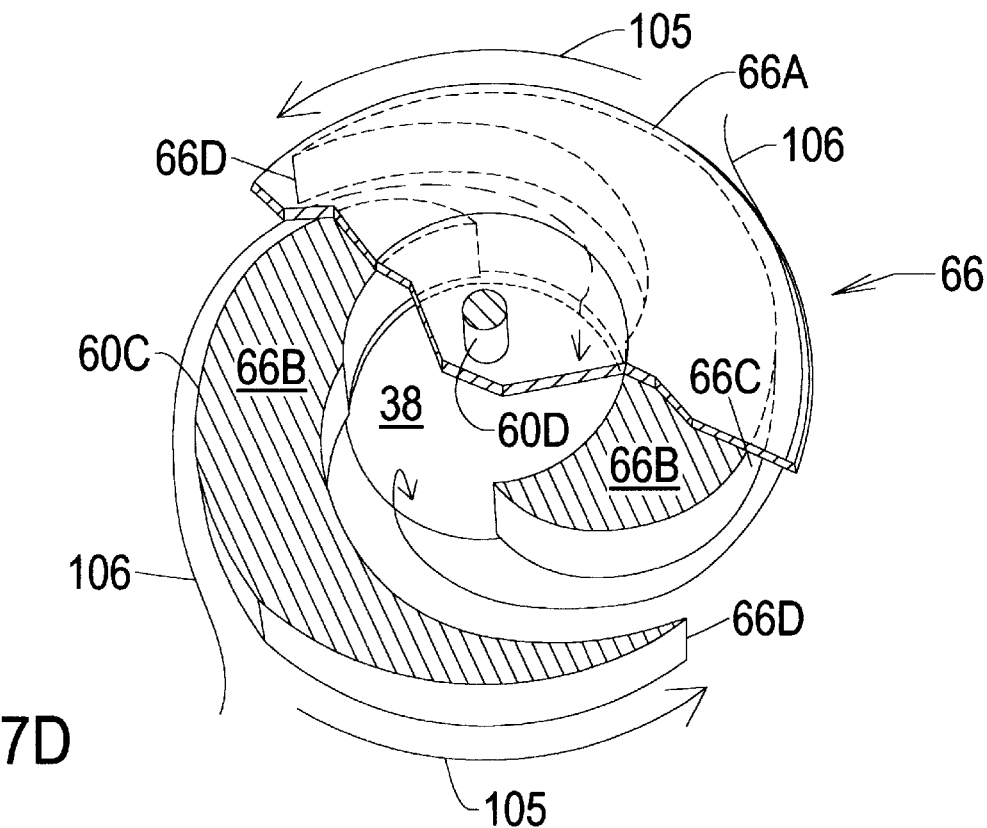

Description—FIG. 7D

An urging member 66 comprises a shaft portion 60D projecting upwardly from the center of a frusto-conical top 66A (sectional view) that is identical to the top 65A disclosed in FIG. 8C. Disposed beneath the frusto-conical top is a plurality of urging elements 66B partially illustrated with hidden lines. The diametrically arranged urging elements 66B are substantially identical to each other and combine to form two urging channels illustrated by arrowed lines 106. Each channel substantially begins with the gradual inward inclination or spiraling of the vertical periphery wall 66C of each urging element 66B and the leading edge 66D of the other urging element 66B. The elements 66B are preferably arranged so that the urging channels widen as they progress from the periphery spirally inward toward the discharge aperture 38. At the aperture 38, the vertical walls of the urging elements 66B substantially circumscribe a portion of the perimeter of the discharge aperture 38. The urging elements 66B are illustrated as solid, however, they may optionally be hollow or arranged from other suitable elements to form the outer facing vertical surfaces to form the urging channels.

Operation—FIG. 7D

As the urging member 66 rotates in the direction of discharge rotation 105 food particulate disposed in the annular area of repose and most adjacent the vertical peripheral walls 66C of the urging elements 66B is urged inward beneath the frusto-conical top 66A as the peripheral walls 66C spiral inwardly. As rotation continues, the leading edge 66D of the opposing urging element subsequently divides the food particulate, after which the food particulate remaining in the channel is urged to the discharge aperture 38 as illustrated by the arrowed lines 106.

The urging channels enhance the consistency of amount discharged with each revolution of the urging member 66 and impart a non-pulsing feed rate. As a result, the predictability of the feed rate at various rotational speeds of the urging member is enhanced. The relatively narrow and spirally disposed directing channels provide enhanced clearing of the urging path during anti-discharge rotation of the urging member and further inhibit accidental discharge of food particulate by jostling of the device.

Figure 7E:
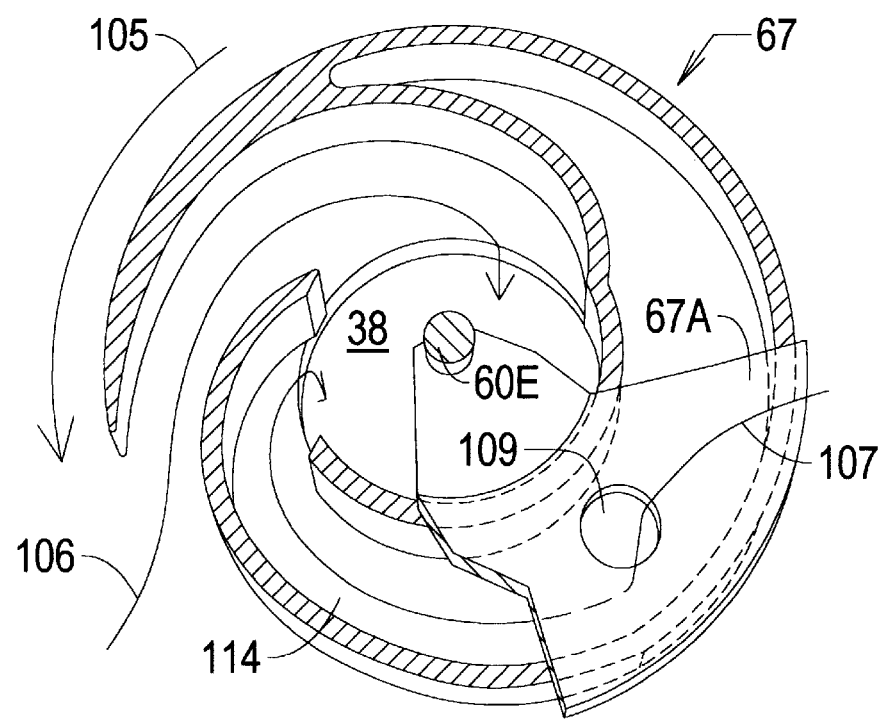

Description—FIG. 7E

An urging member 67 comprises a shaft portion 60E projecting upwardly from the center of a frusto-conical top. 67A (sectional view). An urging element defined by a vertically arranged wall forms an urging channel substantially like the urging channels disclosed in FIG. 7D and illustrated by arrowed line 106. Like urging member 66 in FIG. 7D, the urging channel preferably widens as it progresses spirally inwardly. Additionally, the urging element forms a hollow area 114 that is closed to the outer periphery of the urging member 67 and to the urging channel 106, but is open to the discharge aperture 38. An aperture 109 is arranged in the frusto-conical top 67A above the hollow area 114. An arrowed line 107 illustrates a path that proceeds from the topside of the frusto-conical top 67A, vertically down through the aperture 109, through the hollow area 114, and to the discharge aperture 38. While the directing walls are disposed to form a single urging channel, a plurality of such urging channels may optionally be similarly formed beneath the frusto-conical top 67A.

Operation—FIG. 7E

Urging member 67 is operatively the same as urging member 66 (FIG. 7D) through implementation of a similar urging channel and therefore, provides like operational advantages.

The present invention provides superior resistance to crushing or pulverizing the food particulate as previously described. However, fine particulate and residue are inherently distributed with animal food. Urging member 67 incorporates a structural disposition of elements to eliminate any fine particulate and residue that may enter into the area above the frusto-conical top 67A and below the underside of the directing flange 104A (FIGS. 1, 2, and 6). During discharge rotation 105, the aperture 109 in the frusto-conical top portion 67A and the hollow area 114 below it cooperatively provide a path 107 to urge particulate that may become trapped above the top 67A portion to exit the hopper through the discharge aperture 38.

Figure 8:
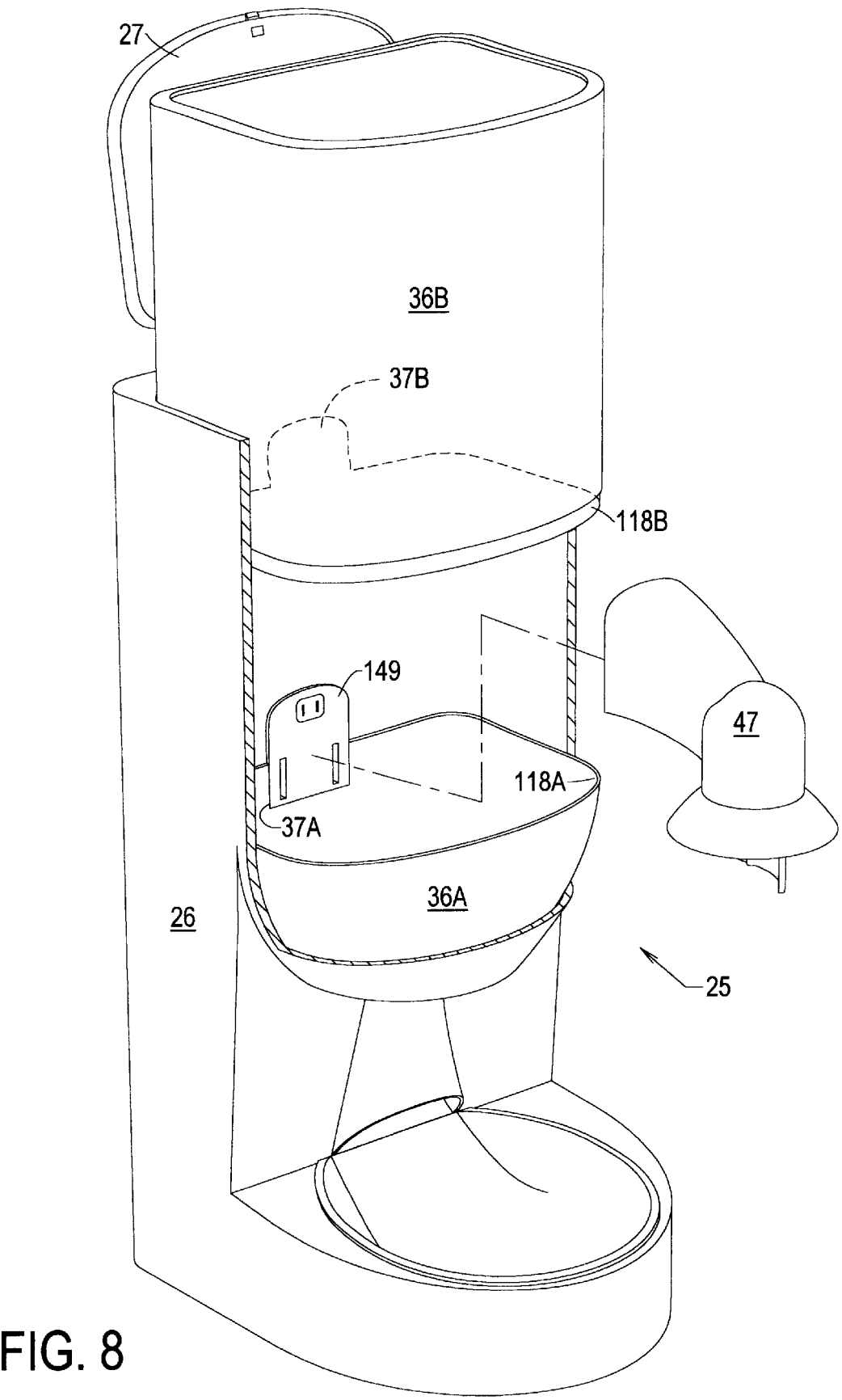
FIG. 8 shows a modified segmented hopper.

Description—FIG. 8

FIG. 8 illustrates another embodiment of a segmented removable hopper arranged within and supported by the housing 26 of the device 25, and the directing structure 47 removed from the hopper interior. The lid 27 is in an opened position. Shown through a cut away portion of the housing 26, a segmented hopper comprising an upper part 36B is shown as being vertically partially removed from the housing 26, and a lowerpart 36A that may be removable or non-removable. A lower rim 118B of the upper part 36B is indented inwardly and arranged to suitably nest into the top rim 118A of the lower part 36A. The division of the two parts of the hopper 36A and 36B are disposed at an elevation substantially at the middle of a coupling surface 149 to which the directing structure 47 couples. Complementarily shaped formations 37B and 37A in the upper and lower hopper parts 36B and 36A are arranged to cooperatively form a hole around the periphery of the coupling surface 149 suitable to allow coupling of the directing structure 47 to the coupling surface 149 illustrated with a projection line between the two. The division of the two parts of the hopper may be arranged at any suitable hopper cross-section.

Operation—FIG. 8

The two-piece hopper disclosed in FIG. 8 shares all operational aspects and advantages of hopper 34 disclosed in FIGS. 1 and 2. A segmented hopper provides additional ease of manual manipulation of the hopper and the directing structure when cleaning and maintenance are required.

Figure 9A:
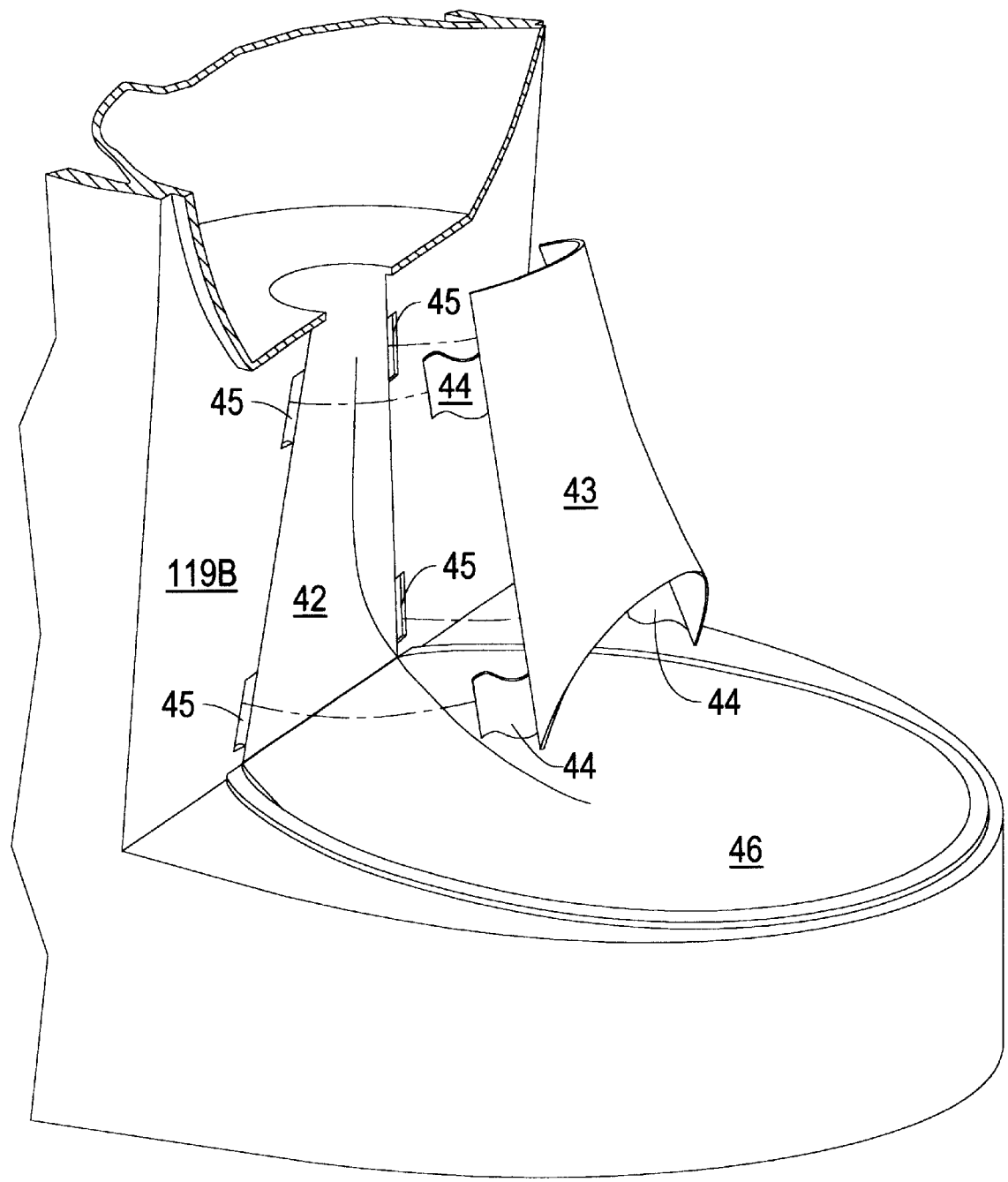
FIGS. 9A and 9B show modified conveying structures that are removable in whole and in part.
Figure 9B:
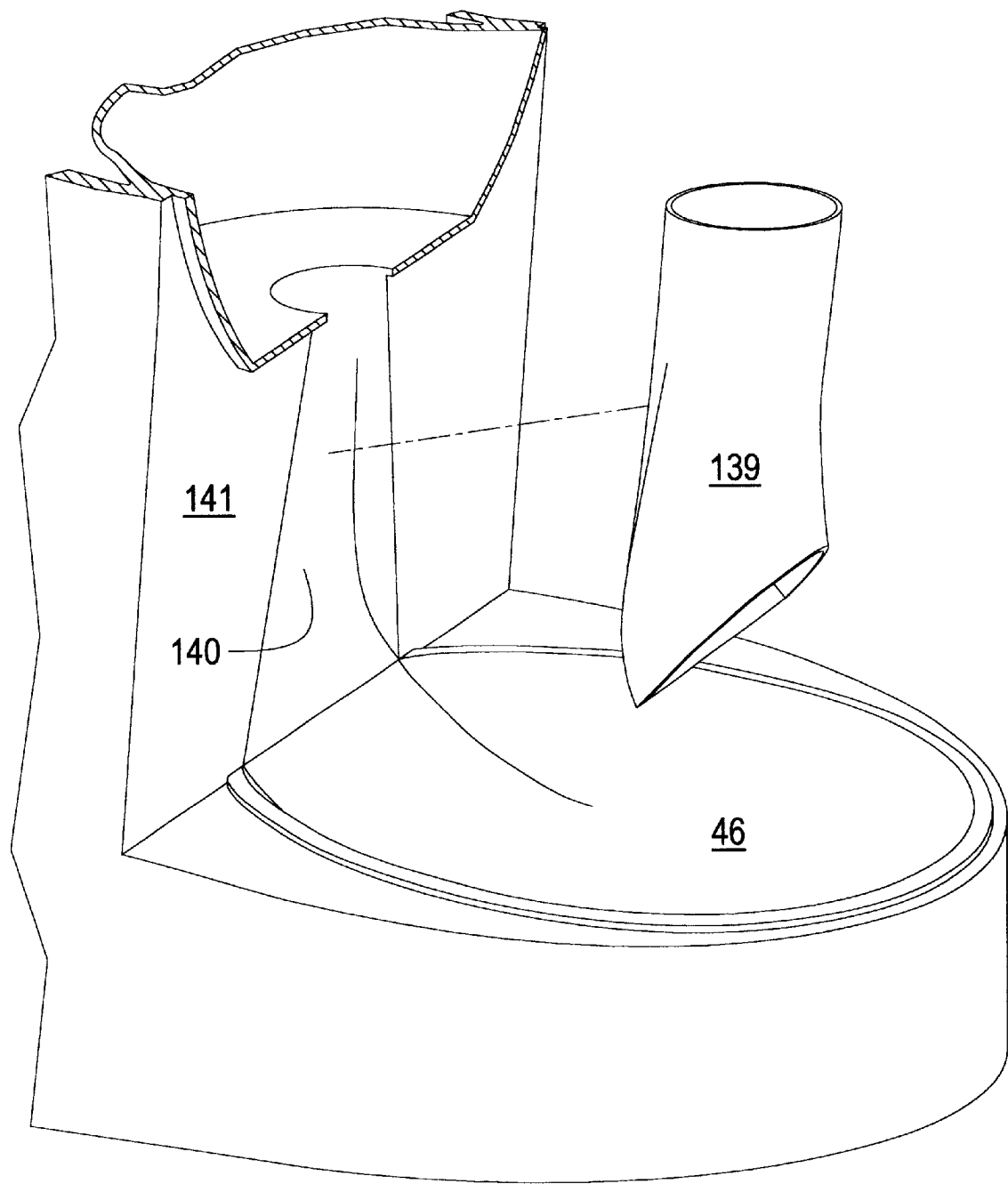

Description—FIGS. 9A and 9B

FIGS. 9A and 9B each Illustrates a sectional view of the lower portion of the device housing and bowl 46 as previously disclosed, and two additional embodiments of a directing tube arranged to direct and convey the food particulate discharged from the hopper to the bowl.

FIG. 9A illustrates a directing tube composed of two-halves 42 and 43. Half 42 is disposed as a recess in the substantially vertical portion 119B of the device housing and is fixed or not removable. Half 43 is removable as illustrated by the projection lines. A plurality of projections 44 on the removable half 43 that are pretensioned laterally toward each other and arranged to engage and couple with the fixed half 42 through complementarily arranged receiving slots 45.

FIG. 9B Illustrates a one piece directing tube 139 that is removable and is preferably arranged to frictionally securely nest into a complementarily shaped portion 140 of the housing 141.

Operation—FIGS. 9A and 9B

A removable or partially removable discharge tube enhances the ability to access, clean and maintain all areas of the device with which the food particulate comes in contact.

Section 43 (FIG. 9A) is removably coupled to the housing 119B (FIG. 9A) by manually aligning the projections 44 with the receiving slots 45 and applying sufficient longitudinal force rearward to seat the projections 44 into the slots 45. The recess 42 and the removable portion 43 combine to form a discharge tube substantially identical to discharge tube 40 (FIGS. 1 and 2). The removable one-piece discharge tube 139 (FIG. 10B) is similarly removably attached to a complementarily arranged opening or recess in the housing. The discharge tube 139 (FIG. 10B) and the removable portion 43 (FIG. 10A) are removed from the device by inserting one or more fingers into the lower outlet aperture and pulling longitudinally forward. Other well-known means can alternatively be employed to effect the removability of all or part of the conveying structure.

Description and Operation—FIG. 10

FIG. 10 illustrates a modular electrical layout of the device. Through a suitable timer/control interface 88, the operator interfaces with a timer/control module 87 and may program the timer time of day, feeding intervals and quantities of food to be dispensed. At predetermined feeding intervals, the timer/control module 87, utilizing a suitable power supply 89, energizes a motor 53 to impart discharging motion to an urging member 122 for an interval of time or number of rotations necessary to dispense the desired quantity of food and, optionally, to reverse the rotation momentarily after the discharge interval. During periods of unavailability of external power, a suitable battery backup 86 is arranged to provide operative power.

An open lid indicator 91 is disposed to prevent the timer/control from energizing the motor 53 when the hopper lid is open or unlatched. An audio generator module 90 is preferably employed to produce an audio signal at each feeding interval or when an open or unlatched condition of the lid is detected. Modular elements of the type illustrated in FIG. 10 are well known and any suitable combination may be arranged to provide predetermined operational results.

Figure 11:
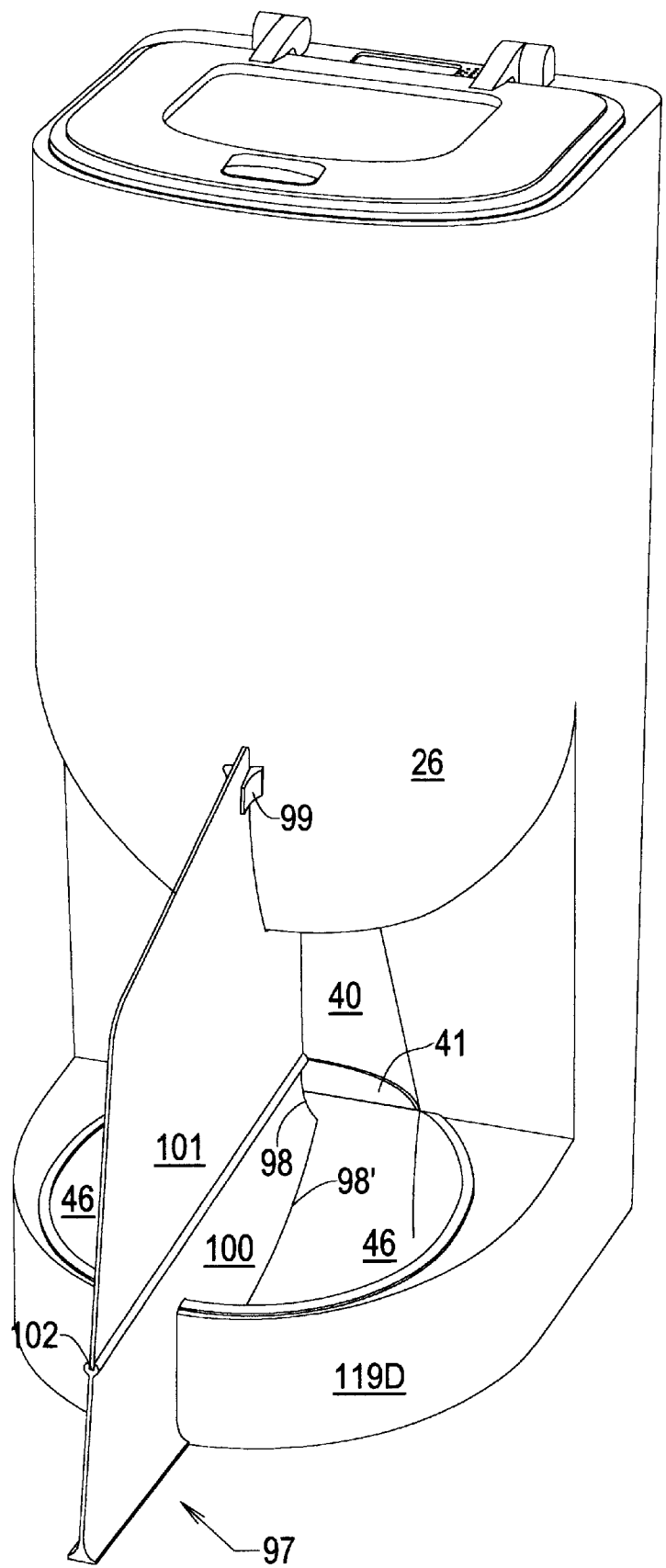
FIG. 11 shows a food dividing partition attachment.

Description—FIG. 11

FIG. 11 illustrates a food splitting partition attachment 97 comprising a plurality of vertically disposed elements 100 and 101. The lower piece 100 comprises an edge 98' that substantially conforms to the center longitudinal interior section of the bowl and extends forward of the feeder base 119D to rest on the floor. Piece 100 further comprises a dividing edge 98 and a connecting groove 102. The upper piece 101 is arranged to suitably conform to a portion of the housing 26 and project to a suitable height. Stability enhancing projections 99 attach to the housing 26 and may be employed where suitable.

Operation—FIG. 11

The plurality of pieces 100 and 101 facilitate installation and storage of the partition 97 when not in use. Installation is accomplished by first centering and installing the lower piece 100 longitudinally and then sliding the upper piece into the connecting groove 102 rearwardly until it seats with the housing 26 and the stability projection 99.

When feeding two animals, the quantity of food dispensed is adjusted accordingly. At feeding intervals, the dividing edge 98 splits or divides the food particulate as it exits the discharge tube outlet 41 into two substantially equal amounts disposed on each side of the lower piece 100 within the bowl. The two pieces 100 and 101 combine to form a partition 92 of suitable height and longitudinal depth that visually and physically separates the two animals resulting in less competitive consumption of food.

Figure 12:
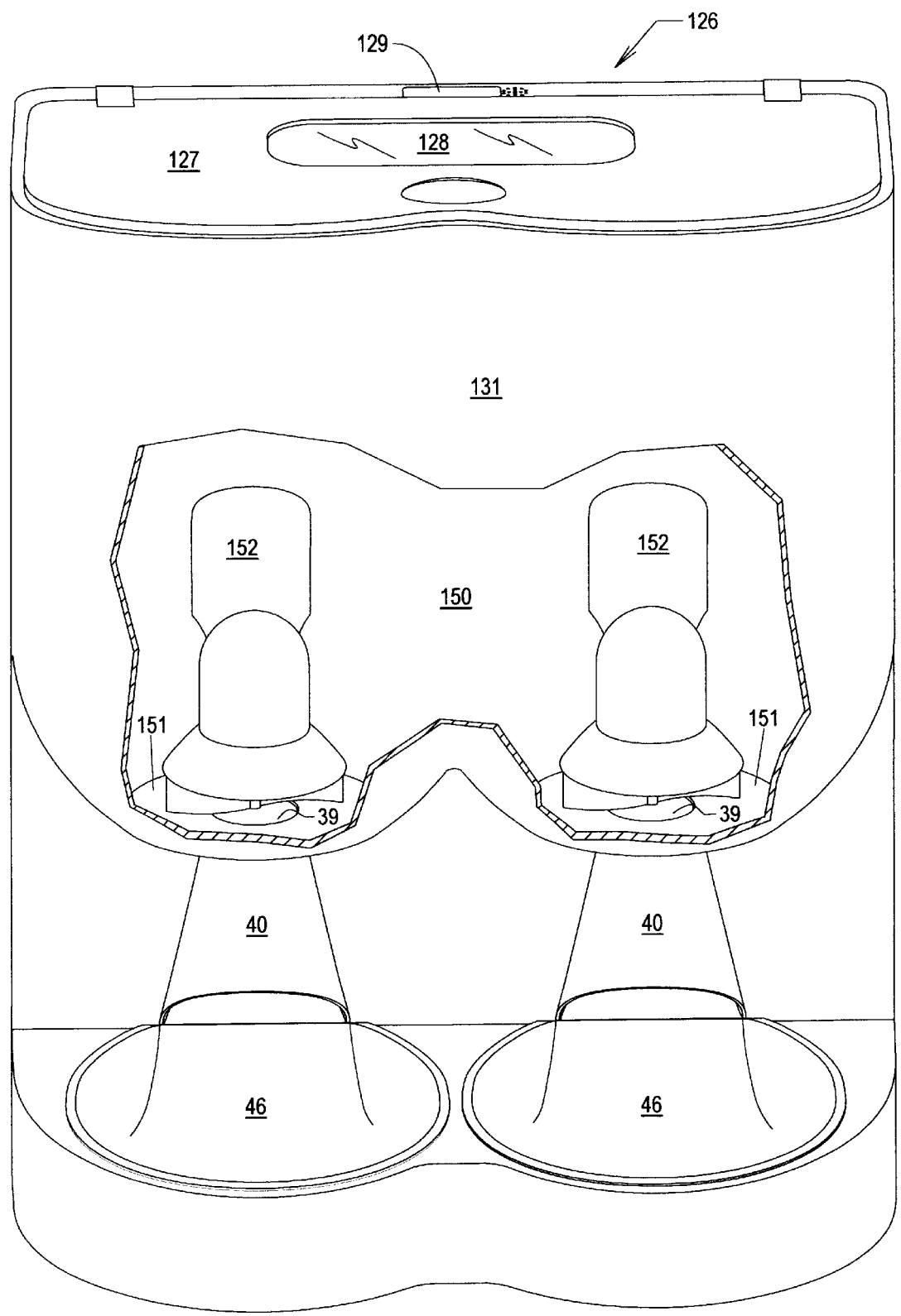
FIG. 12 shows an additional embodiment of an animal feeder arranged to feed a plurality of animals.

Description—FIG. 12

FIG. 12 illustrates a perspective view of an embodiment of a device 126 arranged to feed a plurality of animals. The device is basically a doubling of the device 25 (FIGS. 1 and 2) and preferably shares like elements and objectives not shown or described in FIG. 12. In this way a device disposed to feed three or more animals may be constructed. The feeder comprises pluralities of elements that are identical to those previously disclosed, namely; a plurality of removable directing structures 152, discharge tubes 40, and bowls 46. Arranged within a suitable housing 131, and visible through a cut away portion of the housing 131, is an integral hopper 150 suitable for storing a volume of flowable animal food. A plurality of planar circular hopper floors 151 and discharge apertures 39 are arranged below the directing structures similarly to the device 25 (FIGS. 1 and 2).

A single timer/control interface 129 is also centrally disposed in the top of the device. A removably attached or permanently fixed partition (not shown) similar to the partition 97 (FIG. 11) may also be disposed between the bowls 46.

Operation—FIG. 12

The device 126 allows two animals to be feed with one unit and from individual bowls, which may be preferable for large or highly competitive animals. The device 126 is operationally similar to the device 25 (FIGS. 1 and 2). Food is stored in a common hopper 150. The interior of the hopper directs the food particulate around the two directing structures 152 to the two planar floors 151. The separate directing structures 151 discharge separate servings through separate discharge tubes 40 to separate bowls 46. The interface preferably has the functionality of feeding two animals or just one, in which case only one side would be energized.

CONCLUSION, RAMIFICATIONS, AND SCOPE

Accordingly, the reader will see that this invention accomplishes the Objects and Advantages previously set forth in that section. The device provides an animal or pet owner an animal feeding device of heretofore unrealized reliability and trustworthiness due, in large part, to the anti-bridging and anti-jamming properties of the device. The device is safe to use and leave unattended. The device is convenient to use since the operator need only fill the hopper and set the timer/control. No other adjustments are needed. The device provides for superior sanitation through ease of access to all internal areas through which the animal food passes. The device, in total, provides an animal or pet owner with a tool to effectively and reliably control the diet of their pet or animal.

While the above descriptions contain many specificities, these should not be construed as limitations on the scope of the invention, but rather as exemplifications of preferred embodiments thereof. Many other variations are possible. For example:

The housing may be shaped or configured differently from that shown and may support different elements or combinations of elements disclosed as part of the device. It may comprise a single piece or element, or a plurality of suitably joined elements. The housing may not be present at all with some or all of the remaining elements of the invention being supported independently or in combination.

The timer/control means may be arranged differently from that shown in the drawings. It may be any of many well-known types, may be arranged outside of the device, or not present as part of the device. It may provide more or less functionality than that disclosed above. The interface may be different from that shown.

The hopper may be configured, shaped, or arranged differently from that shown. The discharge aperture may be non-circular, arranged differently or be located elsewhere from that shown provided it is substantially within or adjacent a void or urging area within the volume of food particulate stored within the hopper. The access opening can be configured or arranged differently or other means of conveying the food particulate into the hopper may be employed eliminating the need for an access opening. The hopper may be fixed, integral, not removable, or removable in part from the device. The lid for the hopper may not be present or arranged differently to that shown. It may be frictionally secured without latch, handle or hinges. It may be made of a substantially flexible material. It may not include a window means or the window means may be included elsewhere in the device such as the hopper and/or the housing whereby the level of food within the hopper can be viewed. The device may be arranged to allow filling of the hopper substantially indoors and conveyance of the food to a substantially outdoor receptacle. The device may allow filling of the hopper from substantially outside an animal containment structure and conveyance of the food to a receptacle substantially inside the containment structure. The device may comprise a plurality of hoppers and or discharge apertures.

The urging member may be arranged differently or elsewhere from those illustrated provided it is capable of urging food particulate from an area of repose to a discharge aperture. It may be fixed or alternatively removable in whole or in part from the device by means of a combination of well-known elements. It may comprise a single piece or element, or a plurality of suitably joined elements, some or all of which may be rigid or flexible. The urging elements of the urging member may not be curved. They may extend into the area of repose or be radially shorter than shown. The urging member may not be coaxial to the discharge aperture. It may alternatively be operable to move linearly, revolve partially around an axis, or swing back and forth around an axis in order to urge food particulate to a discharge aperture. The urging member may alternatively be supported and/or operatively connected by means that are located outside the directing structure or arranged below the hopper and pass substantially up through the bottom of the hopper or the discharge aperture. The device may comprise a plurality of urging members.

The directing structure may be arranged, shaped and configured differently from that shown provided it creates at least one suitable void or urging area within the volume of food stored within the hopper such that the food particulate is inhibited from freely flowing into the urging area. The urging area it creates may be non-circular and arranged differently from that shown. The area of repose around the urging area may not be annular, may not completely surround the urging area, and may be arranged differently than that shown. The directing structure may be attached or removably attached to the device elsewhere from that shown. It may be fixed or integral with the hopper or device. It may not have a directing flange. It may comprise a single piece or element, or a plurality of suitably joined elements of predetermined rigidity. The directing structure may be supported by other well-known means not shown. It may extend out of the hopper and be supported by means outside of the hopper. It may employ any of many well known coupling mechanisms in order to be removably coupled to the device. The elements disposed to allow manual manipulation of the coupling mechanism, if employed, may be arranged anywhere on or within the device. The device may comprise a plurality of directing structures. The directing structure may comprise and support a plurality of urging members.

The device may comprise any and all necessary electrical wiring, connector means, and supports of types well known in order to suitably energize the elements therein.

The conveying structure and bowl may be omitted or configured, shaped, or arranged differently from those illustrated. They may be integral. They may comprise a single piece or element, or a plurality of separate or joined elements. Each may comprise a single piece or element, or a plurality of suitably joined elements. They may be removable in whole or in part. The device may comprise a plurality of bowls and/or conveying structures. The device may comprise a bowl and/or conveying structure, or a plurality of these, arranged to divide the food particulate into separate portions after it is discharged from the hopper. The device may be configured to dispense food into an operator supplied bowl or receiving member.

The device may be arranged to provide an alternative or adjustable feeding level or elevation from that shown or may provide elements or attachments for optionally raising or lowering the bowl or bowls, or the entire device or parts thereof to a feeding level suitable to the intended animal.

The device may further comprise means for providing drinking water to an animal and means of agitating the drinking water such as a fountain.

The audio generator module may be any of many well-known types and disposed anywhere on or within the device. It may be employed to signal conditions not described above. It may be omitted The means of imparting motion to the urging member may comprise any of many well-known electrically energized elements such as an electric motor, gear motor, solenoid, or a plurality thereof, with any suitable coupling elements for providing operative movement to the urging member. The device may alternatively comprise a hand wound and/or non-electrical means of imparting motion.

The device may be adapted to feed birds, fish, or livestock.

The device may be adapted to dispense flowable particulate material for purposes other than those described above.

Accordingly, the scope of the invention should be determined not by the embodiments illustrated, but by the appended claims and their legal equivalents.

I claim:

1. A device for dispensing food particulate to at least one animal comprising a hopper for storing said food particulate, said hopper including a discharge aperture, an urging area arranged substantially within said hopper and arranged substantially around said discharge aperture, an area of repose arranged adjacent said urging area, a directing means disposed substantially within said hopper for directing said food particulate within said hopper away from said urging area and into said area of repose wherein gravitational flow or flushing of said food particulate onto said urging area is inhibited, an urging means for urging said food particulate from said area of repose into said discharge aperture whereby said food particulate is discharged from said hopper, means for making discharged food particulate accessible, whereby said discharged food particulate is available to said at least one animal for consumption.

2. The device of claim 1 further including a support structure or housing adapted to maintain said device upright.

3. The device of claim 1 wherein said urging means is disposed substantially within said urging area.

4. The device of claim 1 wherein said device further comprises a motion means for imparting operative motion to said urging means in a direction of discharge operation, whereby said food particulate is urged to exit said hopper through said discharge aperture.

5. The device of claim 4 wherein said motion means is operable for imparting operative motion to said urging means in a direction substantially opposite said direction of discharge operation, whereby said food particulate is urged away from said discharge aperture.

6. The device of claim 4 wherein said motion means comprises an electric motor and connecting means for connecting operative motion from said electric motor to said urging member.

7. The device of claim 6 wherein said motion means further includes gear means for altering said operative motion imparted by said electric motor, whereby said motion means can impart a predetermined operative speed and torque to said urging means.

8. The device of claim 1 further including a timer control means for operatively controlling the device, whereby a human can control the amount of said food particulate the device dispenses and when it is dispensed.

9. The device of claim 1 wherein said urging means includes at least one urging element having a predetermined orientation, a support means, and an axis of operation, said at least one urging element being arranged to operate substantially around said axis of operation, said support means for supporting said at least one urging element and for maintaining said predetermined orientation of said at least one urging element relative to said axis of operation.

10. The device of claim 9 wherein said urging means includes a plurality of said at least one urging elements.

11. The device of claim 9 wherein said axis of operation is arranged substantially coaxial to said discharge aperture.

12. The device of claim 9 wherein said at least one urging element comprises at least one urging vane having a predetermined cross-sectional shape, said at least one urging vane including an inner end and an outer end, said inner end being adjacent said axis of operation, said outer end adapted to engage said food particulate in said area of repose, whereby said food particulate is urged along said at least one urging vane and into said discharge aperture.

13. The device of claim 12 comprising a plurality of said urging vanes.

14. The device of claim 9 wherein said at least one urging element comprises at least one urging channel, said at least one urging channel comprising an outer opening and an inner opening, said outer opening arranged to engage and direct food particulate from said area of repose into said at least one urging channel, said inner opening arranged to direct said food particulate into said discharge aperture.

15. The device of claim 14 comprising a plurality of said urging channels.

16. The device of claim 1 wherein said directing means is removably coupled to said device, said device further including coupling means for removably coupling said directing means to said device, whereby said directing means can be removable from said device for cleaning and maintenance.

17. The device of claim 1 wherein said hopper further comprises an access opening, and a lid means operable to open and close said access opening.

18. The device of claim 17 further comprising a lid condition detection means for preventing operation of said urging means when an open lid condition is detected whereby injuries and malfunction may be avoided.

19. The device of claim 1 further comprising means to removably mount said device to a substantially stable surface whereby upright stability of said device is enhanced.

20. The device of claim 1 further comprising means for dispensing a plurality separate portions of said food particulate, whereby a plurality of said at least one animals can be feed.

21. The device of claim 1 wherein said means for making discharged or dispensed food particulate accessible includes a conveying means and a receiving means, said conveying means for conveying said food particulate from said discharge aperture to said receiving means, said receiving means for receiving said food particulate from said conveying means and from which said at least one animal can feed.

22. The device of claim 21 wherein said conveying means comprises an inlet wherein food particulate enters said conveying means, an outlet through which said food particulate exits said conveying means, said outlet being substantially greater in cross section than said inlet, whereby clumping of said food particulate as it passes through said conveying means is inhibited.

23. A device for dispensing flowable animal food to at least one animal comprising a first means for holding a volume of said flowable animal food, said first means comprising at least one discharge passage whereby said flowable animal food can exit said first means, a second means for creating a void substantially adjacent said at least one discharge passage and within said volume of said flowable animal food, at least one urging member, a third means for supporting said at least one urging member, a fourth means for receiving said flowable food particulate and from which said at least one animal can feed, a fifth means operatively coupled to said at least one urging member for imparting movement to said at least one urging member, whereby said at least one urging member urges said flowable animal food into said void and into said outlet passage, and whereby said flowable animal food is discharged from said first means and is received by said fourth means for consumption therefrom by said at least one animal.

24. The device of claim 23 wherein said outlet passage is arranged so gravity can assist urging of said flowable animal food to pass through said discharge passage, whereby said flowable animal food is dispensed from said first means.

25. The device of claim 23 wherein said first means is removable from said device.

26. The device of claim 23 further comprising dividing means for dividing said flowable animal food discharged from said first means into a plurality of portions, said fourth means comprising a plurality of recesses for holding said plurality of portions, whereby a plurality of animals can be feed.

27. A method of dispensing flowable food particulate for animals to at least one animal comprising:

(a) providing a hopper comprising a discharge aperture and an access opening, and providing a directing means for directing food particulate within said hopper, (b) providing food particulate and placing a volume of said food particulate within said hopper through said access opening, said food particulate partially surrounding said directing means, and forming a void within said volume of said food particulate substantially around said discharge aperture and adjacent said directing means, and forming an area of repose adjacent said void, (c) providing urging means, said urging means urging said food particulate from said area of repose, into said void, and into said discharge aperture, (d) discharging of said food particulate through said discharge aperture, whereby said food particulate is dispensed and made available to said at least one animal for consumption.

* * * * *